United States Patent [19]

Noguchi et al.

[11] Patent Number: 5,406,429
[45] Date of Patent: Apr. 11, 1995

[54] SYSTEM FOR AUTOMATICALLY ADJUSTING PARAMETERS OF A DIGITAL SIGNAL REPRODUCING APPARATUS

[75] Inventors: Tatsumi Noguchi, Kanagawa; Masato Tanaka, Tokyo, both of Japan

[73] Assignee: Sony Corporation, Tokyo, Japan

[21] Appl. No.: 33,557

[22] Filed: Mar. 18, 1993

[30] Foreign Application Priority Data

Mar. 23, 1992 [JP] Japan .................. 4-095831

[51] Int. Cl.6 .................. G11B 5/35; G11B 5/00; G11B 5/09
[52] U.S. Cl. .................. 360/65; 360/32
[58] Field of Search .................. 360/65, 27, 32, 46, 360/51, 53, 65; 375/13, 120; 358/142, 147; 371/6

[56] References Cited

U.S. PATENT DOCUMENTS

| | | | |
|---|---|---|---|
| 3,977,023 | 8/1976 | Nakamura et al. | 360/67 |
| 4,109,236 | 8/1978 | Besenfelder et al. | 371/6 |
| 4,348,699 | 9/1982 | Tsuchiya et al. | 360/32 |
| 4,590,524 | 5/1986 | Okamoto et al. | 360/32 X |
| 4,600,943 | 7/1986 | Tanabe | 358/147 |
| 4,673,979 | 6/1987 | Kobo et al. | 358/142 |
| 4,928,287 | 5/1990 | Tanaka | 360/32 X |
| 5,065,413 | 11/1991 | Fukuda | 360/51 X |
| 5,101,309 | 3/1992 | Mitsuhashi | 360/68 |

Primary Examiner—Aristotelis Psitos
Assistant Examiner—Patrick Wamsley
Attorney, Agent, or Firm—Jay H. Maioli

[57] ABSTRACT

In a digital signal reproducing apparatus various adjustment jobs and measurement jobs can be automatically executed by a simple operation by providing a clock generator, an external waveform equalizer, an error detector, an edge detection circuit, and a DC following circuit in addition to a waveform equalizer by which a reproduced analog signal waveform is processed and then converted to a digital signal. The digital signal is equalized by a digital filter and sampled and the digital signal and extracted clocks are supplied. The reproducing level and the equalizer coefficients can be automatically adjusted and an error rate can be automatically measured. A pulse width modulation or bias recording can be automatically determined and a recording current can be automatically adjusted by the system and the inclination of magnetic heads and the distance between the heads can also be automatically measured.

10 Claims, 27 Drawing Sheets

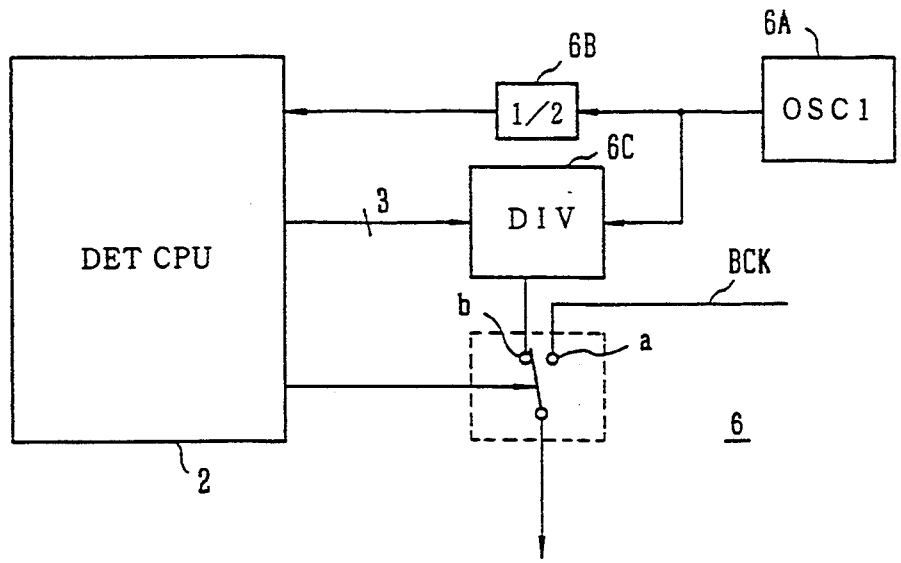
FIG. 3
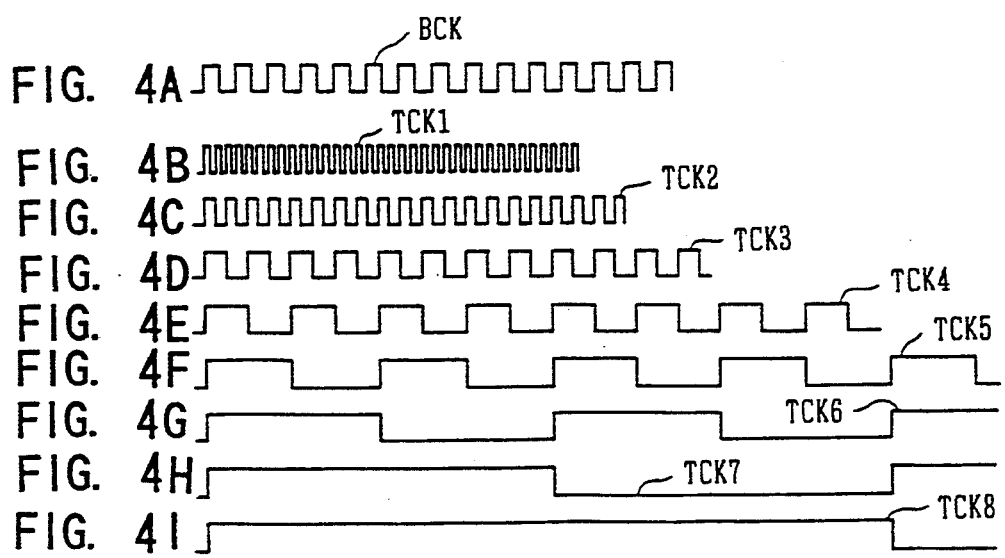

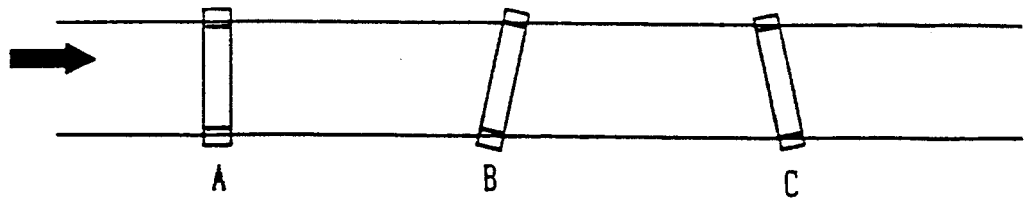
FIG. 28
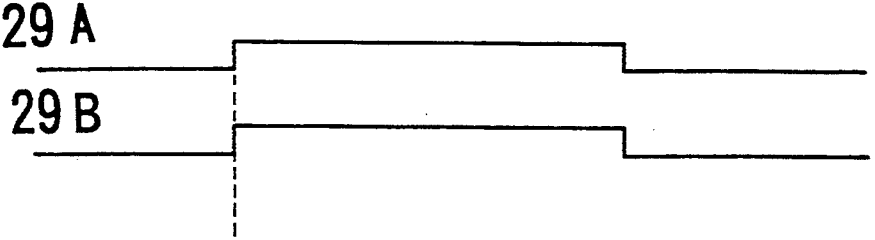
FIG. 29 A
FIG. 29 B
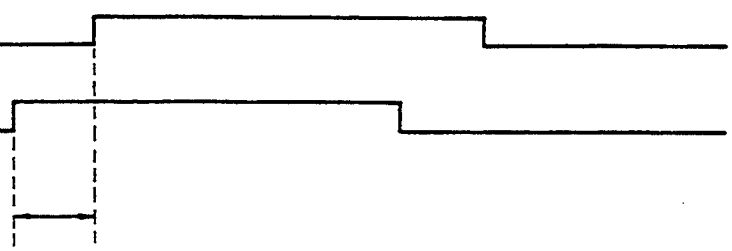
FIG. 29 C
FIG. 29 D
FIG. 29 E
FIG. 29 F

| SET VALUE | ATTENUATION RATIO |
|---|---|
| 7 | 0 dB |
| 6 | -1.5 dB |
| 5 | -3 dB |
| 4 | -4.5 dB |
| 3 | -6 dB |
| 2 | -7.5 dB |
| 1 | -9 dB |
| 0 | -10.5 dB |

FIG. 34

| SET VALUE OF C1 | ATTENUATION RATIO |
|---|---|
| 1FH | 31/32 |
| 1EH | 30/32 |
| 1DH | 29/32 |
| 1CH | 28/32 |
| 1BH | 27/32 |
| ⋮ | ⋮ |
| 2 | 2/32 |
| 1 | 1/32 |
| 0 | 0/32 |

FIG. 35

| SET VALUE OF C3 | ATTENUATION RATIO |
|---|---|
| 1FH | 31/32 |
| 1EH | 30/32 |
| 1DH | 29/32 |
| 1CH | 28/32 |
| 1BH | 27/32 |
| ⋮ | ⋮ |
| 2 | 2/32 |
| 1 | 1/32 |
| 0 | 0/32 |

FIG. 36

| (A,B) | (A,B+1) | (A,B+2) |
|---|---|---|
| (A+1,B) | (A+1,B+1) | (A+1,B+2) |
| (A+2,B) | (A+2,B+1) | (A+2,B+2) |

FIG. 37

| | | | |
|---|---|---|---|
| E11 | E11 | E11 | Y1 |
| E21 | E21 | E21 | Y2 |
| E31 | E31 | E31 | Y3 |
| T1 | T2 | T3 | |

FIG. 38

SYSTEM FOR AUTOMATICALLY ADJUSTING PARAMETERS OF A DIGITAL SIGNAL REPRODUCING APPARATUS

FIELD OF THE INVENTION

This invention relates to a digital signal reproducing apparatus and is applicable to, for example, a digital audio tape recorder.

BACKGROUND OF THE INVENTION

Conventionally, a digital signal reproducing circuit used with a digital audio tape recorder having the DASH format equalizes the continuous analog waveform of a reproduced digital signal obtained from the reproducing head and reproduces the signal from which DC is removed. All of these circuits are composed of analog circuits, in view of the processing speed that is required.

When the digital signal reproducing circuit is adjusted, various kinds of large measuring instruments and skilled workers are needed and thus it is contemplated that a manufacturing process and adjustment process can be greatly simplified if this adjustment can be automatically executed.

Nevertheless, since the digital signal reproducing circuit is composed of analog circuits as described above, the realization of the automatic adjustment thereof is very difficult, so long as the analog circuits are used, from the view point of the circuit arrangement, number of components in use, items to be adjusted, and cost.

SUMMARY OF THE INVENTION

In view of the foregoing, an object of this invention is to provide a digital signal reproducing apparatus by which various adjustments and measurements can be executed by a simple operation.

The foregoing object and other objects of the invention have been achieved by the provision of a digital signal reproducing apparatus for obtaining a digital signal from a reproducing analog signal that itself is obtained by reproducing a previously recorded digital signal from a magnetic tape. The digital signal reproducing apparatus comprises a waveform equalization circuit by which the reproduced analog signal waveform is subjected to predetermined analog signal processing and then converted to a digital signal, in which the waveform of the digital signal is equalized by a digital filter and sampled, so that the digital signal and extracted clocks are produced. A clock generator generates a clock signal having various sampling frequencies as an operation clock of the waveform equalization circuit. An external waveform equalization circuit is provided and an error detection circuit executes error detection of the digital signal obtained from the external waveform equalization circuit, when necessary. An edge detection circuit detects the edge of the digital signal by using the result of the waveform sampling executed by the waveform equalization circuit, and a DC following circuit for removes a DC component from the signal based on the result of the waveform equalization executed by the waveform equalization circuit and inputs the same again to the waveform equalization circuit.

Further, in the digital signal reproducing apparatus, a reproducing level is automatically adjusted in such a manner that an optimum reproducing level is detected based on the result of the waveform sampling executed by the waveform equalization circuit and the gain of the analog signal processing executed by the waveform equalization circuit is controlled.

Also, in the digital signal reproducing apparatus equalizer coefficients are automatically adjusted in such a manner that predetermined equalizer coefficients C1, C3 are set to the digital filter of the waveform equalization circuit, the result of the error detection processing obtained from the error detection circuit is measured, and the result of the measurement is minimized.

Additionally, in the digital signal reproducing apparatus an error rate is automatically measured based on the results of errors detected in the digital signal from the waveform equalization circuit by the error detection circuit.

Further, in the digital signal reproducing apparatus whether the record on the magnetic tape is based on a pulse width modulation recording system or on a bias recording system is automatically determined based on the number of zero-cross points obtained from the result of the waveform sampling executed by the waveform equalization circuit.

Also, in the digital signal reproducing apparatus, the optimum value of recording current is adjusted in such manner that various current values are set as the recording current and then the playback signal level is measured based on the result of the waveform sampling executed by the waveform equalization circuit.

In addition, in the digital signal reproducing apparatus, the inclination of a magnetic head is measured based on the result of the waveform sampling executed by the waveform equalization circuit, the result being obtained by playing back a magnetic tape having predetermined repeating signals recorded at opposite ends of the tape.

Additionally in the digital signal reproducing apparatus, the distance between a preceding head and a succeeding head is measured based on the result of the waveform sampling executed by the waveform equalization circuit, the result being obtained by recording predetermined repeating signals on a magnetic tape and sequentially playing back the magnetic tape.

In the digital signal reproducing apparatus, there are provided the clock generation circuit for generating a clock signal having various sampling frequencies, the external waveform equalization circuit, the error detection circuit, the edge detection circuit, and the DC following circuit in addition to the waveform equalization circuit by which the reproducing analog signal is subjected to the predetermined analog signal processing and then converted to the digital signal. The waveform of the digital signal is equalized by the digital filter and sampled, so that the digital signal and extracted clocks are produced. The digital signal reproducing apparatus can automatically adjust a reproducing level and equalizer coefficients, automatically measure an error rate, automatically determine whether or not a record on a magnetic tape is based on a pulse width modulation recording system or on a bias recording system, automatically adjust the current value of a recording current, and automatically measure the inclination of the magnetic heads and the distance between the heads.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIG. 3 is a block diagram showing the arrangement of a clock generation circuit;

FIGS. 4A to 4I are timing charts showing a clock signal to be generated;

FIG. 28 is a schematic diagram showing the dislocation of head azimuths;

FIGS. 29A to 29F are timing charts showing the relationship between the dislocation of azimuth and a reproducing signal;

FIG. 34 is a table showing a gain capable of being set to an attenuator;

FIG. 35 is a table showing the setting of a filter coefficient (C1);

FIG. 36 is a table showing the setting of a filter coefficient (C3);

FIG. 37 is a table showing the grid of error rates; and

FIG. 38 is a table showing the combination of coefficients.

DETAILED DESCRIPTION OF THE INVENTION

Preferred embodiments of this invention will be described with reference to the accompanying drawings.

(1) Arrangement of the Digital Signal Reproducing Circuit of the Embodiment:

The digital signal reproducing apparatus of the present invention includes digital waveform equalizing large scale integrated circuits (LSI's) by which various automatic adjustments can be realized, a hardware system composed of five peripheral units and respective adjustment methods implemented by software. Therefore, a digital signal reproducing apparatus having automatic adjustment functions will be described first and then the principle of various adjustments and their specific methods serving as the software will be described.

Figure 1:
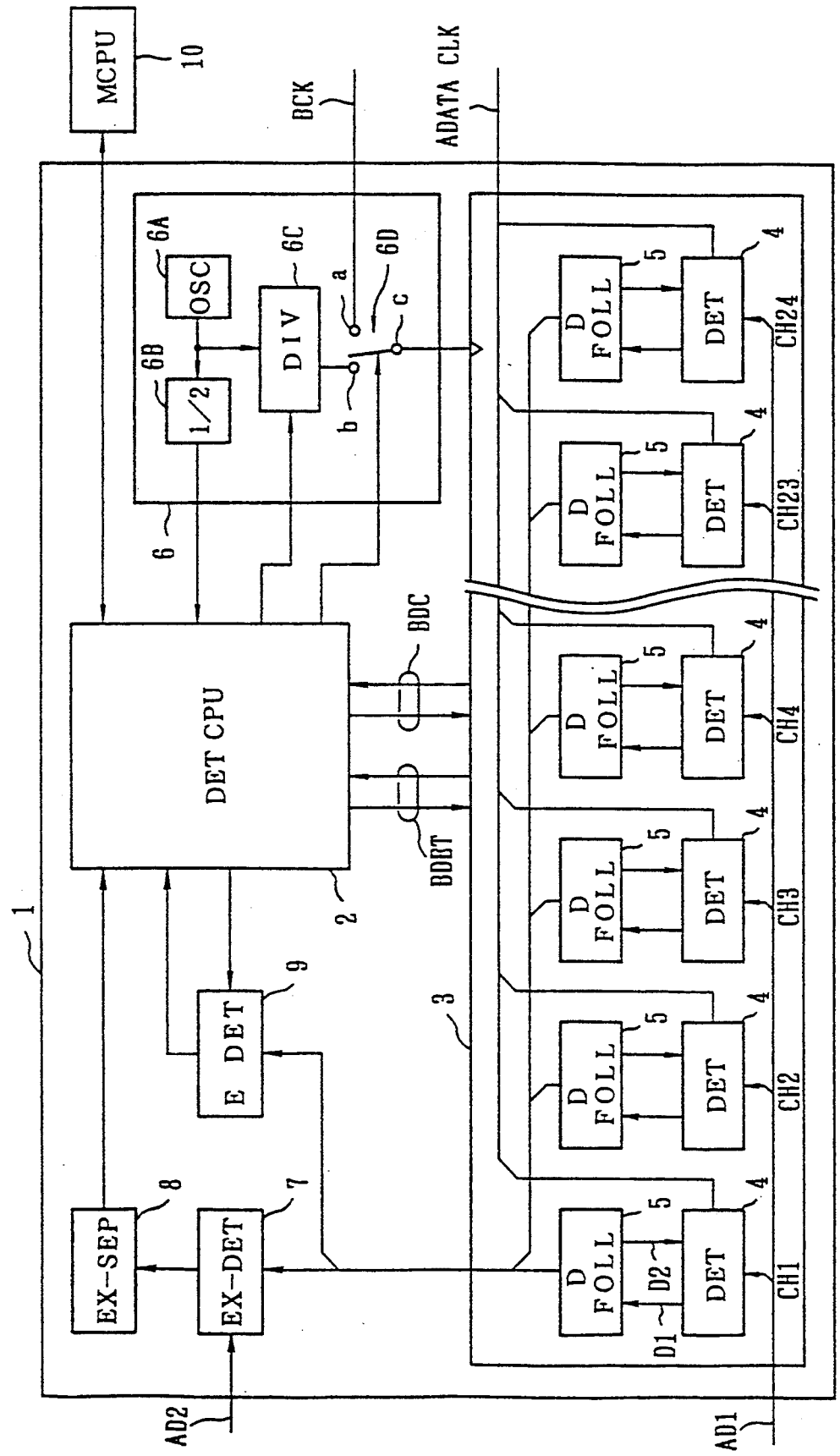
FIG. 1 is a block diagram showing a digital signal reproducing apparatus according to an embodiment of the present invention.

First, as shown in FIG. 1, the features of the digital signal reproducing apparatus 1 having the automatic adjustment functions of this embodiment will be generally described. Specifically, the digital signal reproducing apparatus 1 includes a central processing unit (DET CPU) 2 mounted thereto to control the apparatus as a whole. Further, the DET CPU 2 is controlled by a host central processing unit (MCPU) 10 through a command system and can exchange data by executing serial communication.

The digital signal reproducing apparatus 1 further includes digital waveform equalizing LSIs 4 and, thus, all the waveform equalizing processes conventionally executed by an analog apparatus can be executed by the digital apparatus. The number of the digital waveform equalizing LSIs 4 exceeds the number of channels of digital audio signals by one and the extra digital waveform equalizing LSI is referred to below and show in FIG. 1 as an EX-DET 7.

Further, the operation clock of the digital waveform equalizing LSI 4 can be optionally selected from nine kinds of operation clocks, which are produced by a sampling clock generator 6, known as multi-Fs. Further, the digital signal reproducing apparatus 1 includes a digital DC following circuit 5 mounted thereto which has an additional function to reproduce a DC component contained in a reproducing signal.

The digital signal reproducing apparatus 1 includes an LSI mounted thereto for executing the SYNC detection, demodulation, CRC check, and TBC processing of recorded data based on data derived by the digital signal reproducing apparatus 1 and extracted clocks, and this CRC check block is referred to as EX-SEP 8.

Further, the digital signal reproducing apparatus 1 includes an edge detection circuit 9 mounted thereto for detecting the waveform edge of a reproducing signal and interrupting the DET CPU 2 upon such detection.

(2) Respective Functions of the Digital Signal Reproducing Circuit of the Embodiment:

First, the DET CPU 2 includes a control CPU mounted thereto for controlling the apparatus as a whole. The control CPU functions to control both the reproducing system and the recording system, and they are associated with each other to realize the automatic adjustment of the recording current to be described below.

The DET CPU 2 provides main functions such as communication with the MCPU 10, control of the DET LSI 4 and DC following circuit 5, control of a preamplifier circuit disposed at a preceding stage, detection of presence/absence of a head, setting of an edge threshold value to the edge detection circuit, measurement of the count number of the CRC error block, setting of the operation clock of the DET LSI 4, setting of a digital monitor channel, determination of PWM/BIAS recording, self-diagnosis of the reproducing system and the like when the apparatus is operated as a reproducing system, and setting of a recording current and the like when the apparatus is operated as a recording system.

Since various values set in the apparatus can be changed by software the DET CPU 2 can set, for example, a special mode when processing with respect to adjustments is executed and this is very beneficial to reducing the size of the apparatus.

In the consideration of a digital audio tape recorder as a whole to which the digital signal reproducing apparatus 1 is mounted, when CPUs are mounted to respective units, the interfaces between the respective CPUs are made complex and a plurality of subjects exist for each processing. Thus, the DET CPU 2 is basically designed such that it does not act as a primary processor but acts as a slave device of the host central processing unit MCPU 10.

More specifically, a system is provided in which the MCPU 10 acts as the subject of a processing and the system executes a predetermined processing based on a command issued by the MCPU 10 through a serial communication bus and returns the result of the processing.

Figure 2:
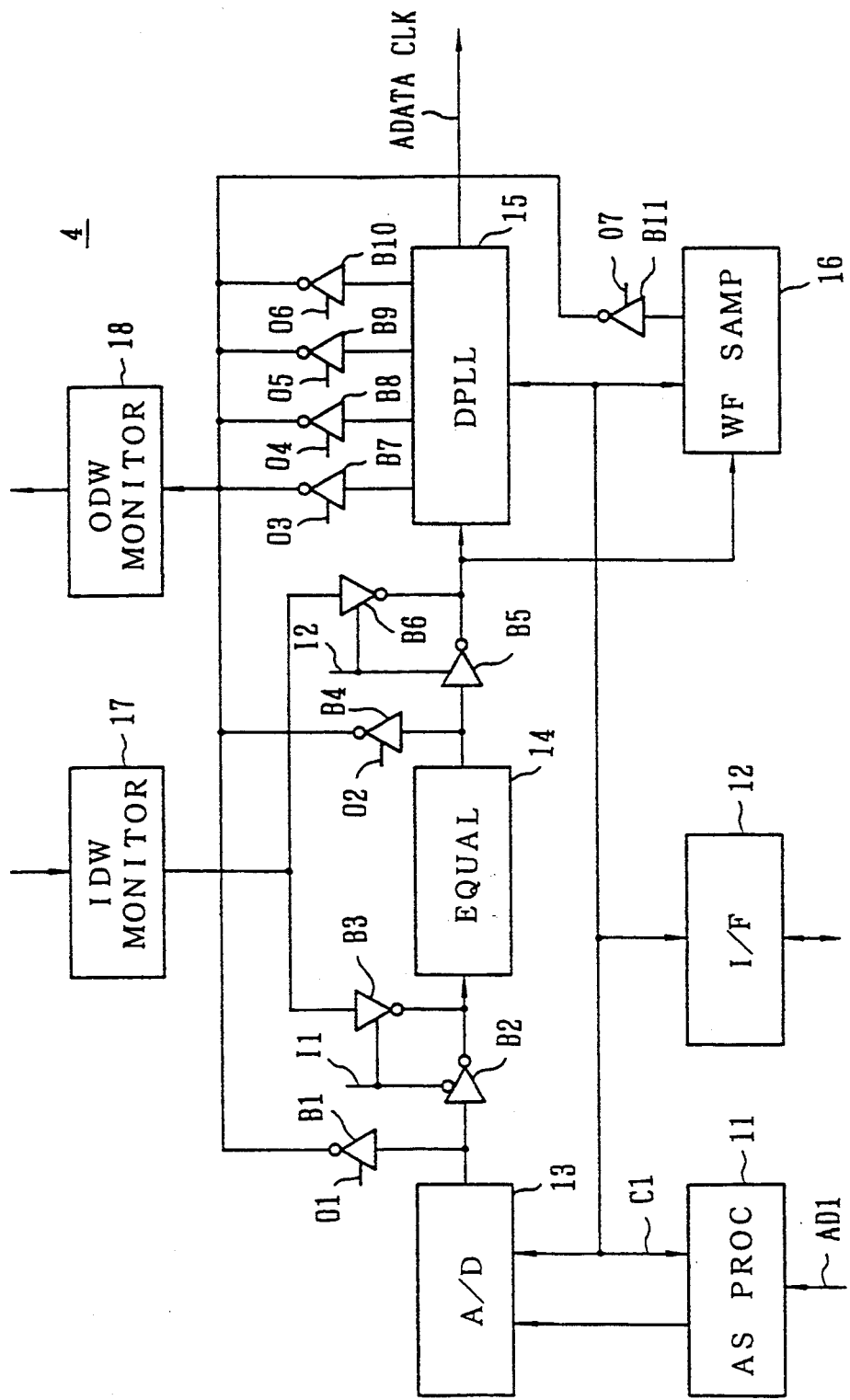
FIG. 2 is a block diagram showing the arrangement of a waveform equalizer unit.

The digital signal reproducing apparatus 1 includes the digital waveform equalizing LSIs 4 mounted thereto and as shown in FIG. 2, one digital waveform equalizing LSI 4 is composed of an analog signal processing circuit 11 composed of an attenuator and clamp circuit, analog to digital converter 13, 3-tap digital transversal equalizer 14, digital PLL 15, digital waveform sampler 16, serial communication interface 12, and input and output digital waveform monitor circuits 17 and 18.

Among the above components, first, the attenuator of the analog signal processing circuit 11 adjusts the level of an input analog signal. A variable resistor for adjusting a reproducing level is made unnecessary by this function. Further, since the gain can be variable by the DET CPU 2, the reproducing level can be automatically adjusted. As shown in the table of FIG. 34, eight kinds of gains can be set by the DET CPU. The set level is changed by rewriting a port contained in the DET LSI 4 using the DET CPU 2.

Further, a clamp circuit of the analog signal processing circuit 11 clamps the waveform of an analog input. Any one of a DC clamp, a video clamp, and OFF may be selected as necessary. This selection is also executed by rewriting a port contained in the DET LSI 4 by the DET CPU 2.

The analog to digital converter 13 is composed of an analog to digital converter being a so-called half flash type CMOS 7 bits, 15 ms/sec and 60 mW so as to be capable of realizing a high speed and low power consumption and an analog input waveform with an adjusted gain is converted to a digital form by the analog to digital converter 13. The output is composed of a 7-bit complementary form.

The 3-tap digital transversal equalizer 14 is composed of a transposed FIR type digital filter that executes a predetermined equalizing processing to 7-bit data input in the form of two's complement and outputs 8-bit data in the form of two's complement.

The calculation of the equalizing processing is executed by multiplying the 7-bit data by a 5-bit equalizing coefficient. In the respective filter coefficients C1, C2 and C3, C2=−1 is fixed and C1 and C3 can be varied in 32 steps in the range of from 0 to 1. The actual attenuation ratio is as shown in the tables of FIGS. 35 and 36. Further, the equalizer coefficients C1 and C3 are changed by rewriting a port contained in the DET LSI 4 by the DET CPU 2.

The digital PLL 15 is composed of a digital phase locked loop operating at a clock corresponding to a bit clock and items such as the amount of free run deviation, the loop gain, the clock output mode and the like can be controlled by rewriting a port contained in the DET LSI 4.

The digital waveform sampler 16 samples sequential 32-byte digital waveform data from a waveform output of the equalizer 14.

The operation of each block in the DET LST 4 is controlled by its respective control register. A communication circuit for externally controlling the control register is composed of the serial communication interface 12.

The input and output digital waveform monitors 17 and 18 can execute monitor input and output processing of the 8-bit digital waveform by the time sharing of 4 bits×2. The output of the A/D converter 13, that is, the input to the equalizer 14, and the output from the equalizer 14, that is, the input to the digital PLL 15, can be monitored as a monitor input. Further, an output from the A/D converter 13, an output from the equalizer 14, a VCO output from the digital PLL 15, a phase detection output, a second loop output, and a phase comparison output can be monitored as a monitor output.

Here, the original function of the DET LSI 2 is to equalize an input analog waveform and reproduce the previously recorded data. For this purpose, a data extraction clock corresponding to a recorded modulation system and a recording rate must be input as an operation clock of the LSI.

The adjustment of recording current is to be described later, however, it suffices only to measure the level of a reproducing waveform and the phase difference of a reproducing signal and no limitation is imposed on the operation clock of the LSI.

Thus, in the digital signal reproducing apparatus 1 an over-sampling having a rate four times the sampling executed by an original data extraction clock of low rate, which is about 1/32 the above sampling, can be executed by selecting an LSI operation clock from eight kinds of clocks in addition to the original data extraction clock, by the sampling clock generator 6 complying with multi-Fs composed as shown in FIG. 3.

Actually, the original data extraction clock has a frequency of 2.304 MHz shown in FIG. 4A, whereas a necessary clock may be optionally selected under the control of the CPU from the nine different kinds of clocks such as: 8 MHz shown in FIG. 4B, 4 MHz shown in FIG. 4C, 2 MHz shown in FIG. 4D, 1 MHz shown in FIG. 4E, 500 KHz shown in FIG. 4F, 250 KHz shown in FIG. 4G, 125 KHz shown in FIG. 4H, and 62.5 KHz shown in FIG. 4I.

Here, that HDM-1 modulation system employed by the DASH format is not DC free. The clamp circuit contained in the analog signal processing circuit 11 of the DET LSI 4 cannot reproduce a low frequency component generated by the HDM-1 modulation. As a result of the evaluation error rate characteristics, it is found that the DET LSI 4 cannot by itself obtain sufficient characteristics due to the low-frequency component.

Figure 5:
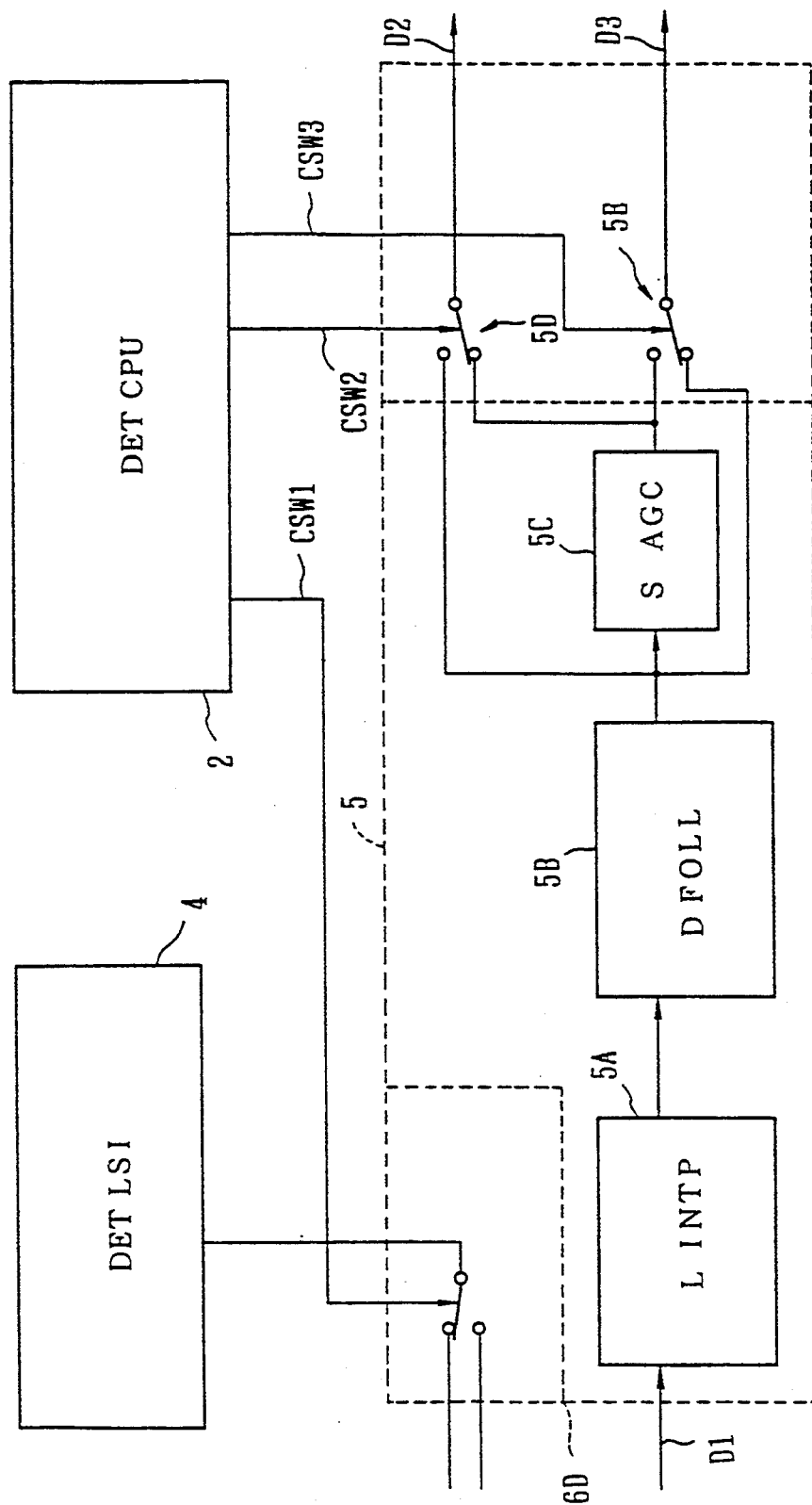
FIG. 5 is a block diagram showing the arrangement of a DC following circuit unit.

Thus, the digital signal reproducing apparatus 1 of this embodiment includes the digital DC following circuit 5 mounted thereto, which corresponds to a conventional analog DC following circuit. The digital DC following circuit 5 is arranged as shown in FIG. 5, and all the processing of the conventional analog DC following circuit is digitally executed by the LSIs.

Further, when the digital DC following circuit 5 is composed of the LSIs, a digital waveform monitor function and a simplified automatic gain control known as a PLL simplified AGC for improving the characteristics of the digital PLL 15 of the DET LSI 4 are added as a function indispensable to realizing the automatic adjustment of the reproducing system.

In a usual or normal state of use, when a self-diagnosis or automatic adjustment is desired an analog signal must be changed, equalizer coefficients must be altered, and PLL simplified AGC must be turned ON/OFF, all of which however, affects the characteristics of an error rate. To solve this problem, the digital signal reproducing apparatus 1 is provided with an additional DET LSI dedicated to adjustment in addition to the DET LST 4 for 24 channels necessary for the function of a main body, and the additional DET LSI is referred to as an EX-DET 7.

Figure 6:
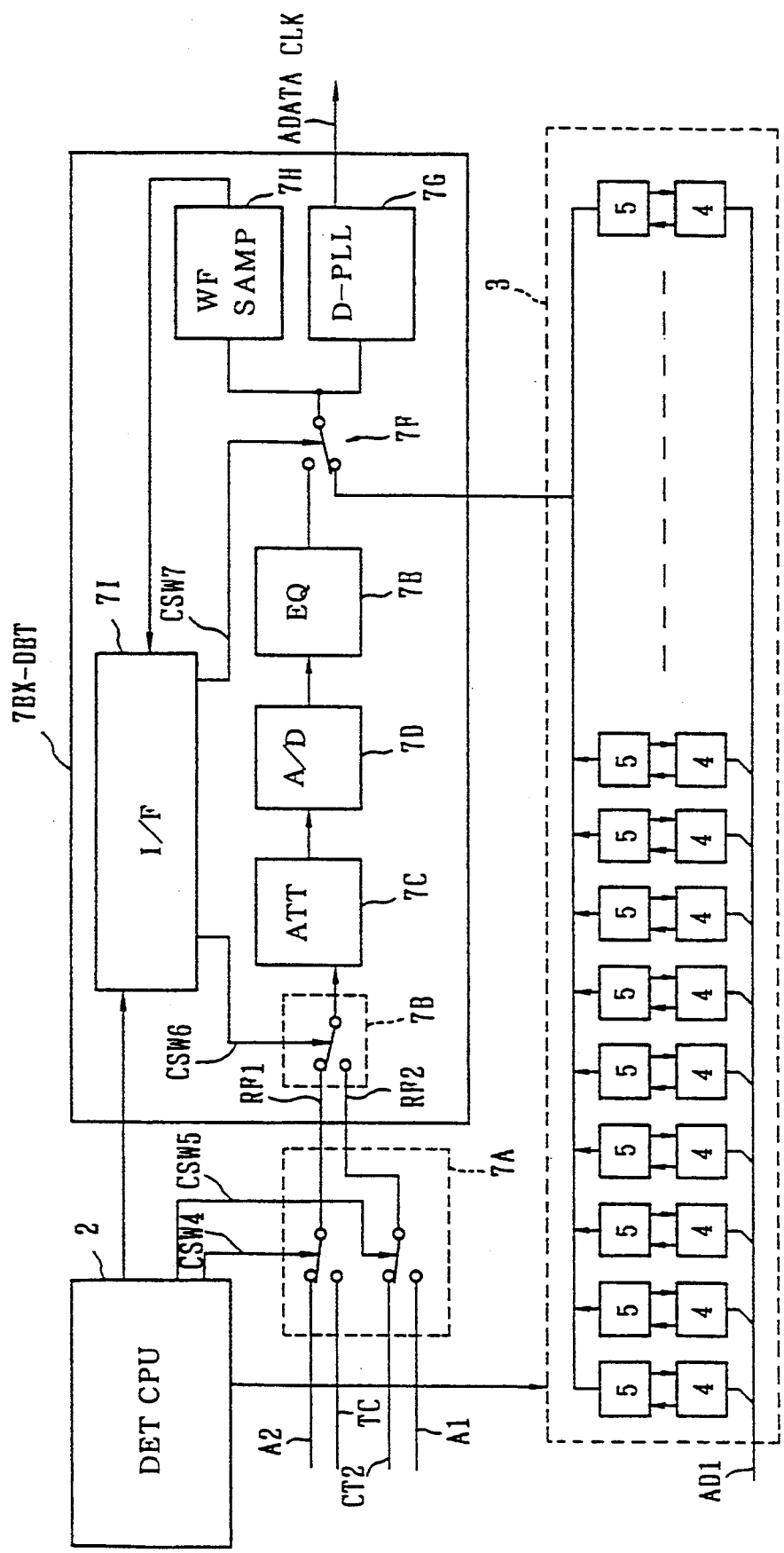
FIG. 6 is a block diagram showing the arrangement of an EX-DET circuit unit.

The EX-DET 7 is arranged as shown within the solid line block in FIG. 6 and realizes the function for automatically determining the AGC and PWM/BIAS of a reproducing signal without affecting the characteristics, even while data is reproduced, by being combined with the digital waveform monitoring function contained in the LSIs of the digital DC following circuit.

Further, the EX-DET 7 automatically measures the error rate by being combined with the so-called EX-SEP 8 to be described later. Further, in a special state of use such as the test mode, the apparatus is arranged such that the recording current of a track in which a waveform is not equalized by the DET LSI 4, that is, the recording current of an AUX track (A1, A2, TC, CTL, is automatically adjusted by using the analog input of the EX-DET 7.

When the reproducing system is automatically adjusted its evaluation value is necessary. In the conventional adjustment of a reproducing system, a playback signal is visually observed using an oscilloscope, a reproducing level and equalizer coefficients are adjusted based a visual examination of the oscilloscope pattern and, finally, the characteristics of its error rate are confirmed. When the conventional method using the visual oscilloscope observation is employed to execute the adjustment of the digital signal reproducing apparatus 1, the automation of the measurement is fairly difficult to be realized. Thus, the error rate is directly measured while changing the equalizer coefficients and the equalizer coefficients are determined based on the measurement.

In this case, the setting of the equalizer coefficients and the measurement of the error rate can be executed anywhere in the system. Since the equalizer coefficients can be optionally set by the DET CPU 2, when only the error rate is be measured the adjustment of the reproducing system can be completely automated.

Figure 7:
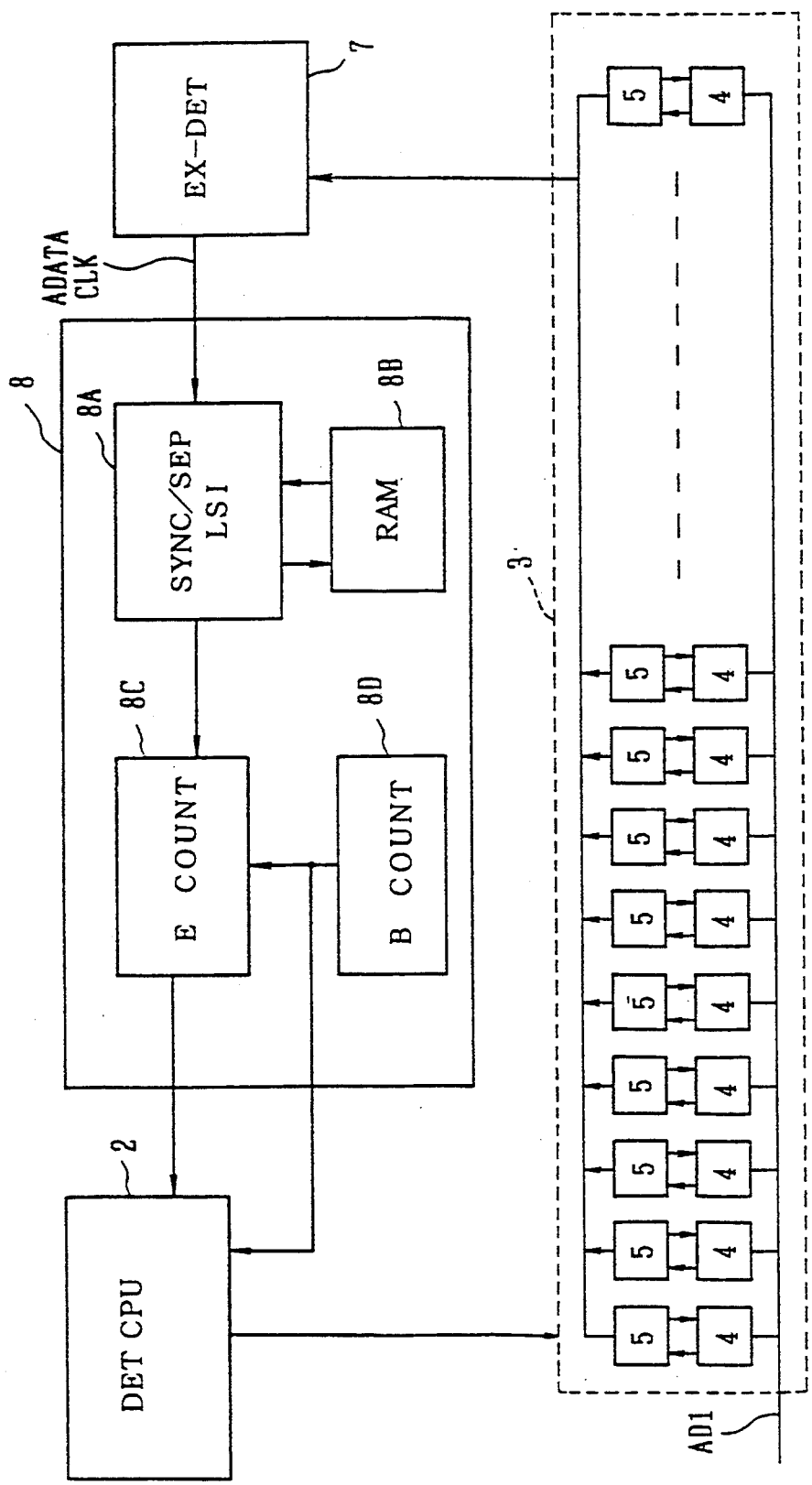
FIG. 7 is a block diagram showing the arrangement of a CRC error detection circuit unit.

Thus, as shown in FIG. 7, to realize the measurement of the error rate in the apparatus, an adjustment LSI is mounted to the apparatus in this embodiment to check the modulation CRC of recorded data and TBC process based on data ADATA extracted by the DET LSI 4 of each channel and extracted clocks CLK. Further, an error counter and block counter are mounted to realize the measurement of the error rate, which conventionally needs a dedicated checker, using the CRC check block referred to as the EX-SEP 8.

The three items of adjustment, that is, the adjustment of the height of a head, the adjustment of a head azimuth, and the adjustment of the distance between the heads, must be executed while a reproducing signal is observed in the mechanical adjustment of a digital audio tape recorder. Among them, two of the adjustment items, that is, adjustment of the height of the head and the adjustment of the head azimuth, can be realized by making use of the digital waveform sampler 16 contained in each DET LSI 4.

Figure 8:
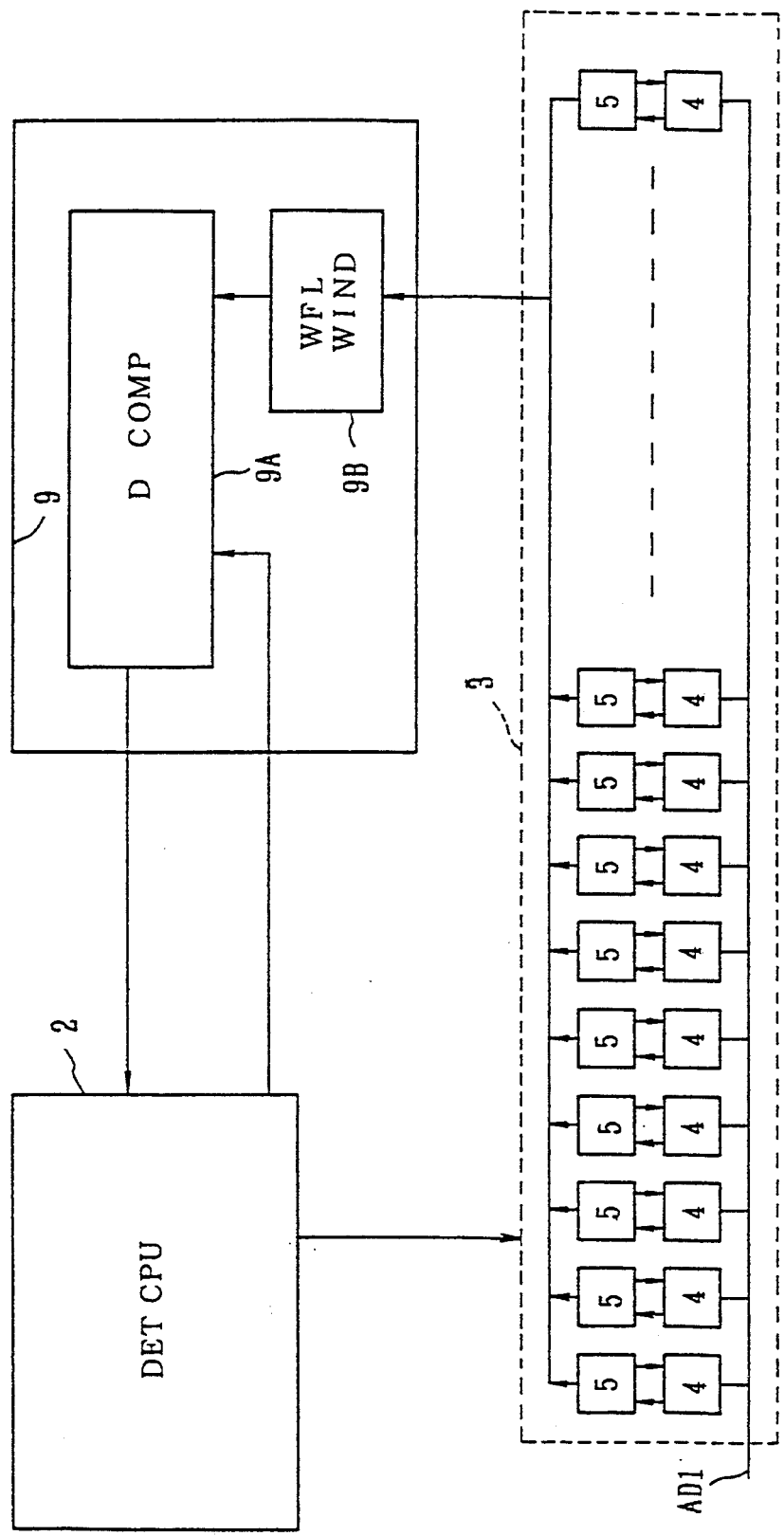
FIG. 8 is a block diagram showing the arrangement of an edge detection circuit.

It has been found, however, that the distance of the heads cannot be sufficiently exactly adjusted by the digital waveform sampler 16. Nevertheless, the distance between the heads must be measured and, thus, the digital signal reproducing apparatus 1 is arranged such that the edge detection circuit 9 is connected to the output from the digital waveform monitor, as shown in FIG. 8, to detect the edge of a reproducing waveform and the DET CPU 2 is interrupted in response to the edge detection signal of the edge detection circuit 9.

Although this apparatus is composed of a very small hardware, it can detect the edge of all the channels and further measure edge intervals with an accuracy of 500 nsec. This is developed to measure the distance between the heads only by the apparatus.

(3) The Principle of Automatic Adjustment of the Digital Signal Reproducing Circuit and the Method of Adjustment:

This apparatus measures a reproducing signal level, a phase difference between reproducing signals, the edge intervals of reproducing signals, and error rate to realize the automation of electric adjustment and to support the mechanical adjustment.

In the above adjustment, the level of the reproducing signal is measured by the digital waveform sampler 16 contained in the DET LSI 4. The waveform sampler 16 can sample waveform data for 32 bytes once each time it is started. The level of the reproducing signal can be measured by determining the average value of the waveform data. Since, however, the data have an accuracy of 8 bits and the number of samples covers only 32 bytes, the measuring accuracy of the waveform sampler 16 is limited. Thus, a measuring accuracy in practical use is increased by starting the waveform sampler a number of times.

Next, the phase difference between the reproducing signals is found by measuring the phase difference between the reproducing signals of two channels. This measurement is also executed by using the digital waveform sampler 16 contained in the DET LSI 4, wherein the waveform samplers 16 in two channels are started simultaneously to measure the difference between the zero-cross points of the sampled data.

Further, the intervals of the edges of the reproducing signal is found by measuring a time elapsed from an edge of the reproducing signal to the next edge thereof. This measurement is executed in such a manner that the DET CPU 2 measures an edge generation time detected by the edge detection circuit 9. Further, the measurement of the error rate is executed by the EX-DET 7 and EX-SEP 8 to evaluate the adjusted state of the reproducing system.

Figure 9A:
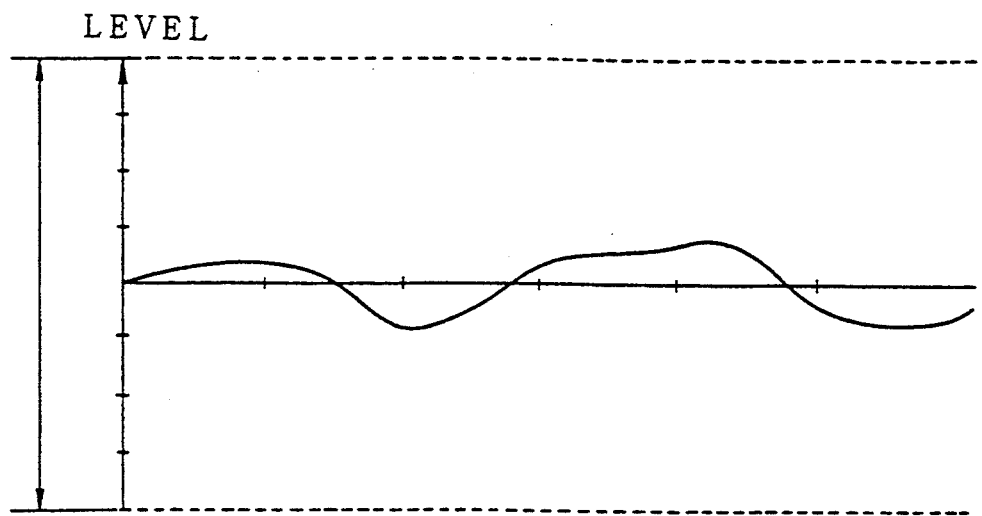
FIGS. 9A and 9B are signal waveform diagrams showing waveforms when a reproducing level is abnormal.
Figure 9B:
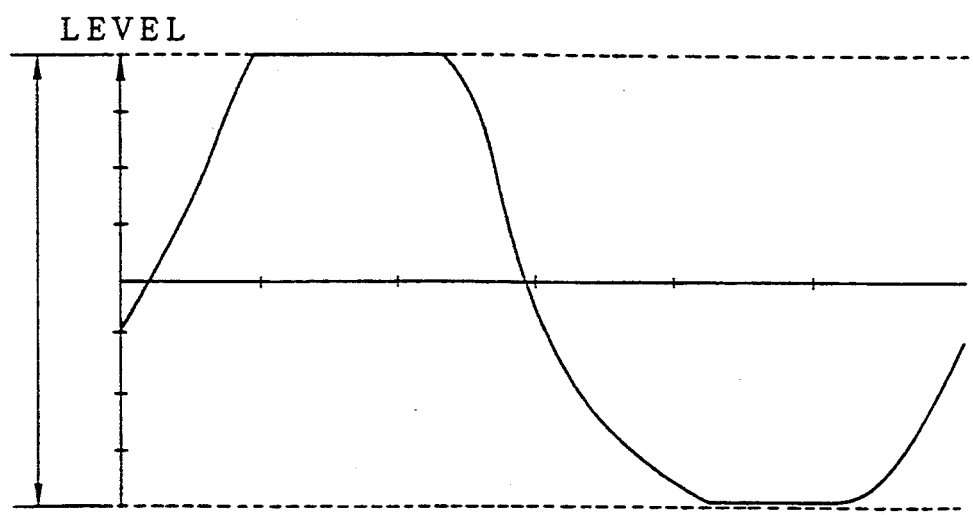

(3-1) The Automatic Adjustment of Reproduction Level:

An analog reproducing signal AD1 fed in to the DET LSI 4 has a dispersed signal level due to the characteristics of the playback head. This dispersed level is automatically corrected by automatic adjustment of the reproducing level. Since an A/D converter has a limited bit accuracy, its input range is limited. As shown in FIG. 9A, when the input level is quite low, quantization errors cannot be ignored, whereas when the input level is quite high, the waveform is clipped, as shown in FIG. 9B.

The DET CPU 2 adjusts the attenuator gain of the DET LSI 4 based on the reproducing waveform sampled by the digital waveform sampler 16 contained in the DET LSI 4. An evaluated value of the adjustment at this time is obtained by combining the following two items.

More specifically, a reference level probability (DO) composed of the ratio of the number of data exceeding a signal level threshold value $TH_L$ to data of $32 \times N$ bytes sampled first is determined by the following equation:

$$\text{reference level probability } (D_o) = \frac{\text{Sum of Data Number } TH_L \text{ or More}}{32 \times N} \quad (1)$$

Then, a full swing probability ($D_f$) composed of the ratio of the number of full swing data to data of $32 \times N$ bytes sampled second is determined by the following equation:

$$\text{full swing probability} = \frac{\text{Sum of Number of Fully Swinging Data}}{32 \times N} \quad (2)$$

Then, a minimum value $D_{omin}$ of the reference level probability is set to the reference level probability ($D_o$) and a maximum value $D_{fmax}$ of the full swing probability is set to the full swing probability $D_f$, and the largest one of AD GAINs satisfying the following equation as an adjustment conditions is determined an optimum AD GAIN.

$$D_o \geq D_{omin} \text{ and } D_f \leq D_{fmax} \quad (3)$$

Figure 10:
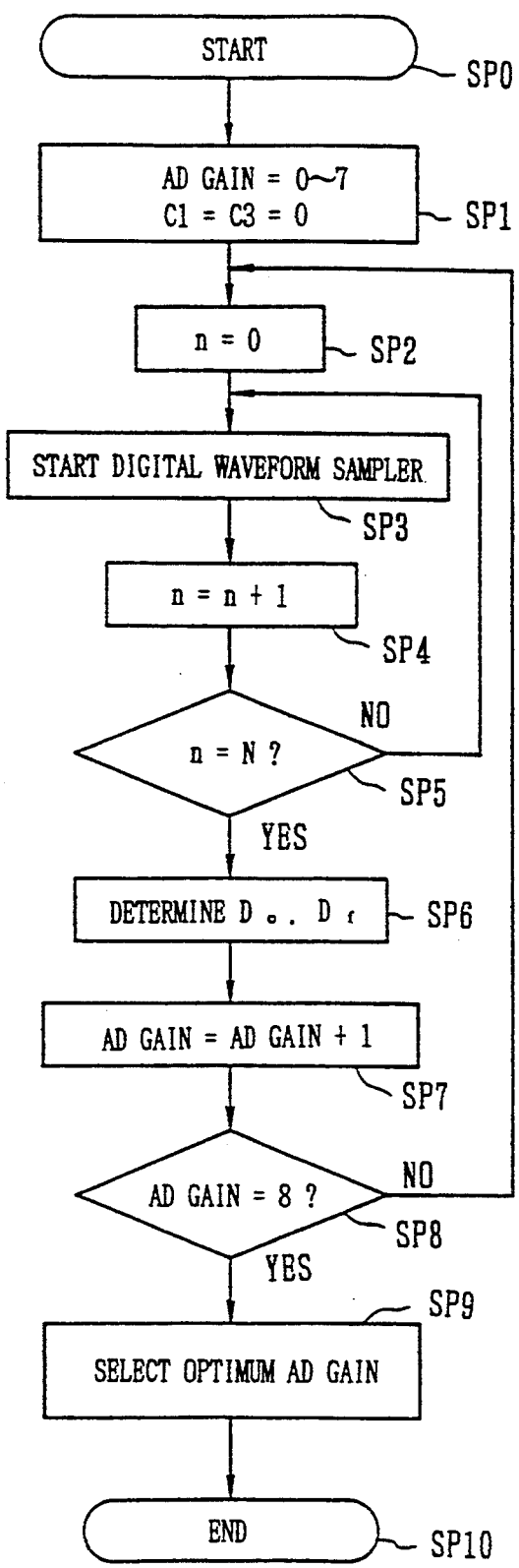
FIG. 10 is a flowchart showing the automatic adjustment processing procedure of a reproducing level.

This processing is executed by an automatic adjustment processing step SP0 having a reproducing level shown in FIG. 10. More specifically, the DET CPU 2 sets AD GAIN and C1, C3 at step SP1 (AD GAIN=0 to 7, C1=C3 =0) and starts the digital waveform sampler 16 at steps SP2 to SP5 to fetch a reproducing waveform. Note, this processing is executed N times to ensure accuracy.

The DET CPU 2 continuously determines the reference level probability $D_o$ and full swing probability $D_f$ based on the sampled digital reproducing waveform at step SP6. This processing is executed for all of the values AD GAIN=0 to 7, an optimum AD GAIN is selected based on eight sets of the reference level probabilities D0, and the full swing probabilities $D_f$ are set to the calculated respective AD GAINs, and then the automatic adjustment processing step SP0 is completed at the next step SP10.

(3-2) The Automatic Adjustment of Equalizer Coefficients for Waveform Equalization:

When a recorded digital signal is reproduced, the zero-cross point of a reproducing signal is dislocated due to the interface between codes. The waveform equalizer, which is a 3-tap transversal-type filter, corrects the dislocation and reproduces a zero-cross point similar to that present when the digital signal was recorded. The equalizer coefficients C1 and C3 must be adjusted in accordance with the characteristics of an analog signal, as determined by the characteristics of the playback head, for example.

This adjustment is automatically executed by the automatic adjustment of the equalizer coefficients for waveform equalization. The equalizer coefficients are conventionally adjusted by the visual inspection of a pattern. Since, however, the characteristics of the error rate as final evaluation object of the reproducing system can be automatically measured in the digital signal reproducing apparatus 1, the method of adjusting the equalizer coefficients is changed to optimize the characteristics of the error rate.

The equalizer coefficients C1 and C3 of the DET LSI 4 are coefficients of 5 bits. As a result, there are $32 \times 32 = 1024$ kinds of combinations for all of C1, C3. Further, when the characteristics of the error rate is to be accurately determined, it takes about 1,000,000 blocks, which is 250 seconds, for each combination of coefficients to measure the characteristics. When they are measured one by one, $250 \times 1024 = 71$ hours are needed. This measurement cannot be practically realized even if an automatic measurement is used.

As a result of evaluation and examination, however, the present inventors have found that the range in which optimum error rate coefficients exist is not always dispersed or distributed evenly. Thus, an adjustment is divided into the steps of rough adjustment and fine adjustment to reduce an error rate measuring range and time. More specifically, the number of error count block is set to 10,000 blocks (2.5 seconds) as the rough measurement and the number of error block counts is measured based on only $16 \times 8$ kinds of combinations of coefficients represented by the following equation:

C1,C3 expressed by hexadecimals (4)

-continued

```
(08,00) (08,01) (08,02) ... (08,07)
(09,00) (09,01) ...        (09,07)
(10,00) ...                (10,07)
  .                           .
  .                           .
  .                           .
(17,00) ...                (17,07)
```

As a result, the number of error block counts for $16 \times 8 = 128$ kinds of combinations of equalizer coefficients can be determined.

Next, the error rate (ER) is determined based on the following equation.

$$\text{error rate } (ER) = \frac{\text{Error Block Count Number}}{\text{Measured Block Number}} \quad (5)$$

The grid of $3 \times 3$ error rates is continuously formed, as shown in the table of FIG. 37, to roughly determine the optimum point of the error rate. Then, a grid by which the sum of the error rates in the grid of $3 \times 3$ is minimized in the grid of $16 \times 8$ of error rates represented by Equation (3) is searched based on the following expression:

$$\text{MIN } (ER(A, B) + ER(A, B+1) + ER(A, B+2) + \quad (6)$$
$$ER(A+1, B) + ER(A+1, B+1) + ER(A+1, B+2) +$$
$$ER(A+2, B) + ER(A+2, B+1) + ER(A+2, B+2))$$

Next, the number of error rate blocks are set to 100,000 blocks (25 seconds) in the fine adjustment and the number of error block counts is measured as shown in the table of FIG. 38 to the $3 \times 3$ kinds of the combination of the coefficients determined by the rough adjustment and a sum is calculated as in the following equations:

$$T1 = E11 + E21 + E31$$
$$T2 = E12 + E22 + E32$$
$$T3 = E13 + E23 + E33$$
$$Y1 = E11 + E12 + E13$$
$$Y2 = E21 + E22 + E23$$
$$Y3 = E31 + E32 + E33 \quad (7)$$

As a result, a coefficient C1 by which a minimum T can be obtained is set as an optimum equalizer coefficient C1 and a coefficient C3 by which a minimum Y can be obtained is set as an optimum equalizer coefficient C3.

(3-3) The Automatic Measurement of Error Rate:

The error rate is conventionally measured by a dedicated error rate checker connected externally to a machine. The digital signal reproducing apparatus of this embodiment contains an error rate checker using the arrangement shown in FIG. 7 for the automatic measurement of the error rate.

The DET CPU 2 selects a channel to monitor and sets a coefficient of the DET LSI 4 of the channel to be monitored. Next, the DET CPU 2 controls the EX-DET 7 to an error count mode and starts the measurement. The output from the error rate counter is fetched by an interrupted input from a block counter 8D.

(3-4) The Automatic Determination of PWM Recording/Bias Recording:

In the DASH format, there are tracks A1 and A2 for recording an analog signal in which an AUX track is cued in independently of the digital track used for executing a typical digital recording. The recording system of this track includes two systems, that is, a bias recording system as a pure analog recording system and a PWM recording system.

Since codes and the like for discriminating these two recording systems are not defined by a format, a recorded signal must be actually observed to determine whether it is PWM recording or bias recording. In the digital track of the digital signal reproducing apparatus 1, the signal is digitized and then the reproduced waveform is sampled by the digital waveform sampler 16 and processed by a microcomputer.

This function is also applied to an analog track so that the tracks A1 and A2 can determine whether it is the PWM recording or bias recording. When this is realized, a problem arises as to whether the additional DET LSI 4 can be added and that since the signal of the AUX track is not subjected to a waveform equalization, the DET LSI 4 is not needed. More specifically, this problem relates to whether the additional provision of the DET LSI 4 only for the purpose of the automatic determination of the PWM recording and bias recording is excessive from the view point of cost.

The EX-DET 7 used for the automatic adjustment of the digital track, AGC and the like, however, only uses its digital input and its analog input is not used. Further, when a signal is reproduced usually in a normal mode and the automatic determination of the PWM recording and bias recording is needed, the EX-DET 7 only intermittently executes a level measurement for the AGC, and thus a determination processing for the PWM recording/bias recording may be relatively easily interrupted.

Figure 11:
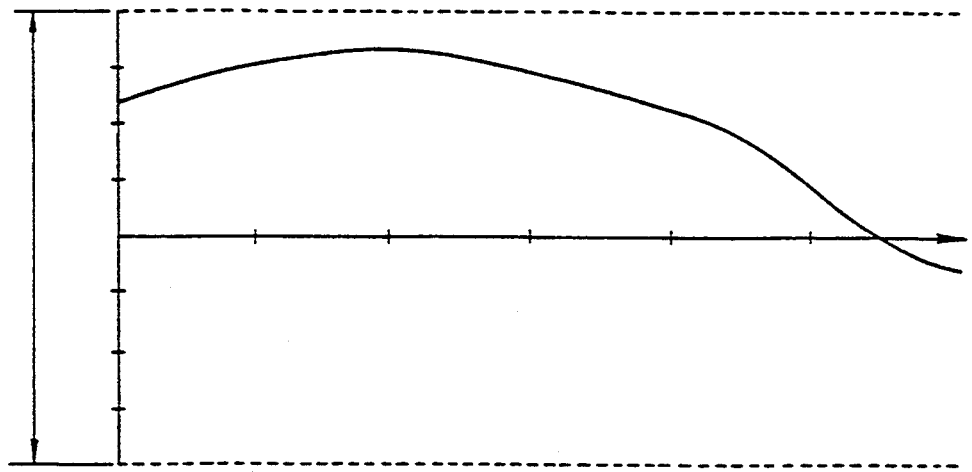
FIG. 11 is a signal waveform diagram showing the reproducing waveform of bias recording.
Figure 12:
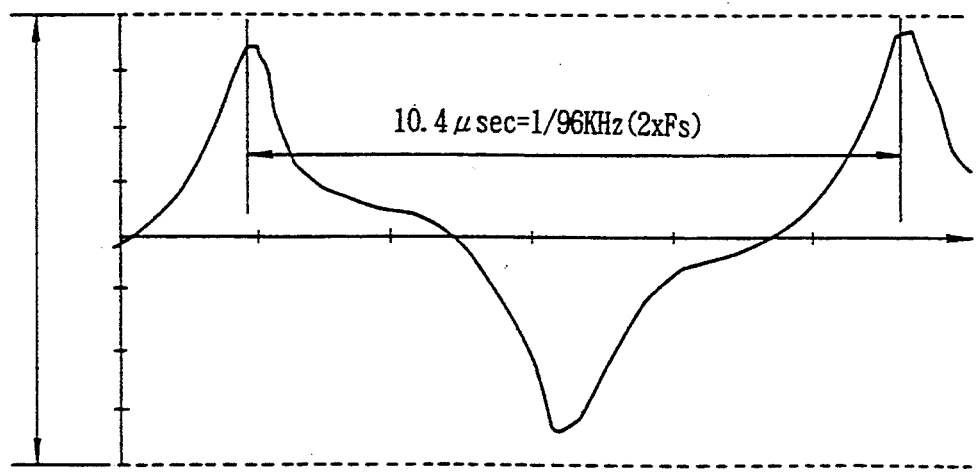
FIG. 12 is a signal waveform diagram showing the reproducing waveform of 4 PWM recording.
Figure 13:
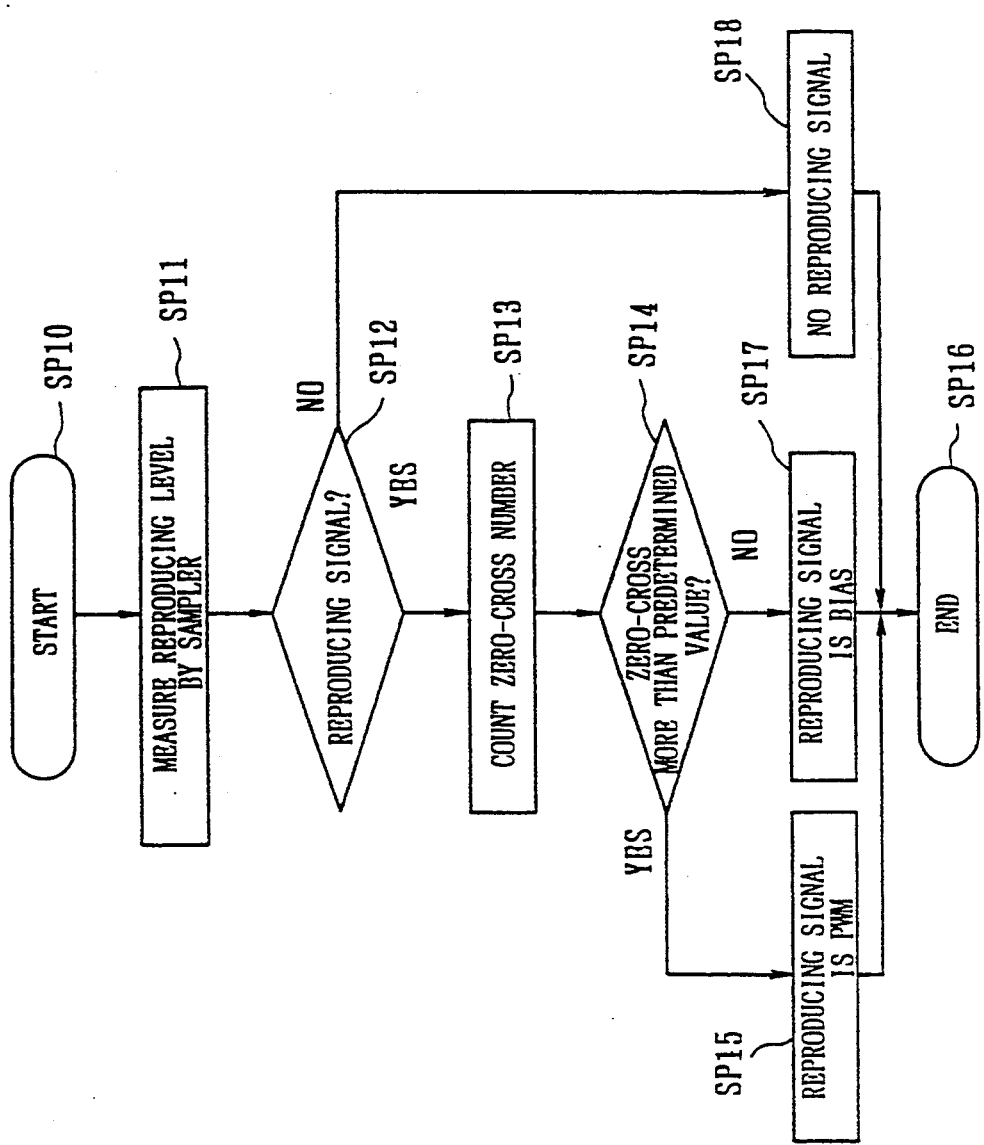
FIG. 13 is a flowchart showing the automatic judgment procedure of PWM recording/bias recording.

Thus, the automatic determination of the PWM recording/bias recording BIAS is realized by making use of the intervals between the analog inputs of the EX-DET 7 and an AGC processing. As shown in FIGS. 11 and 12, the number of zero-cross points of the reproducing waveform of the bias recording is actually different from that of the reproducing waveform of the PWM recording, so that in the automatic determination procedure of the PWM recording/bias recording BIAS shown in FIG. 13 the PWM recording and bias recording can be automatically determined by making use of the different numbers of zero-cross points.

(3-5) The Automatic Adjustment of Recording Current:

The DET CPU 2 in the digital signal reproducing apparatus 1 sets not only the reproducing system but also a recording current value. With this arrangement, the DET CPU 2 automatically measures a reproducing level for each recording current value.

Figure 14:
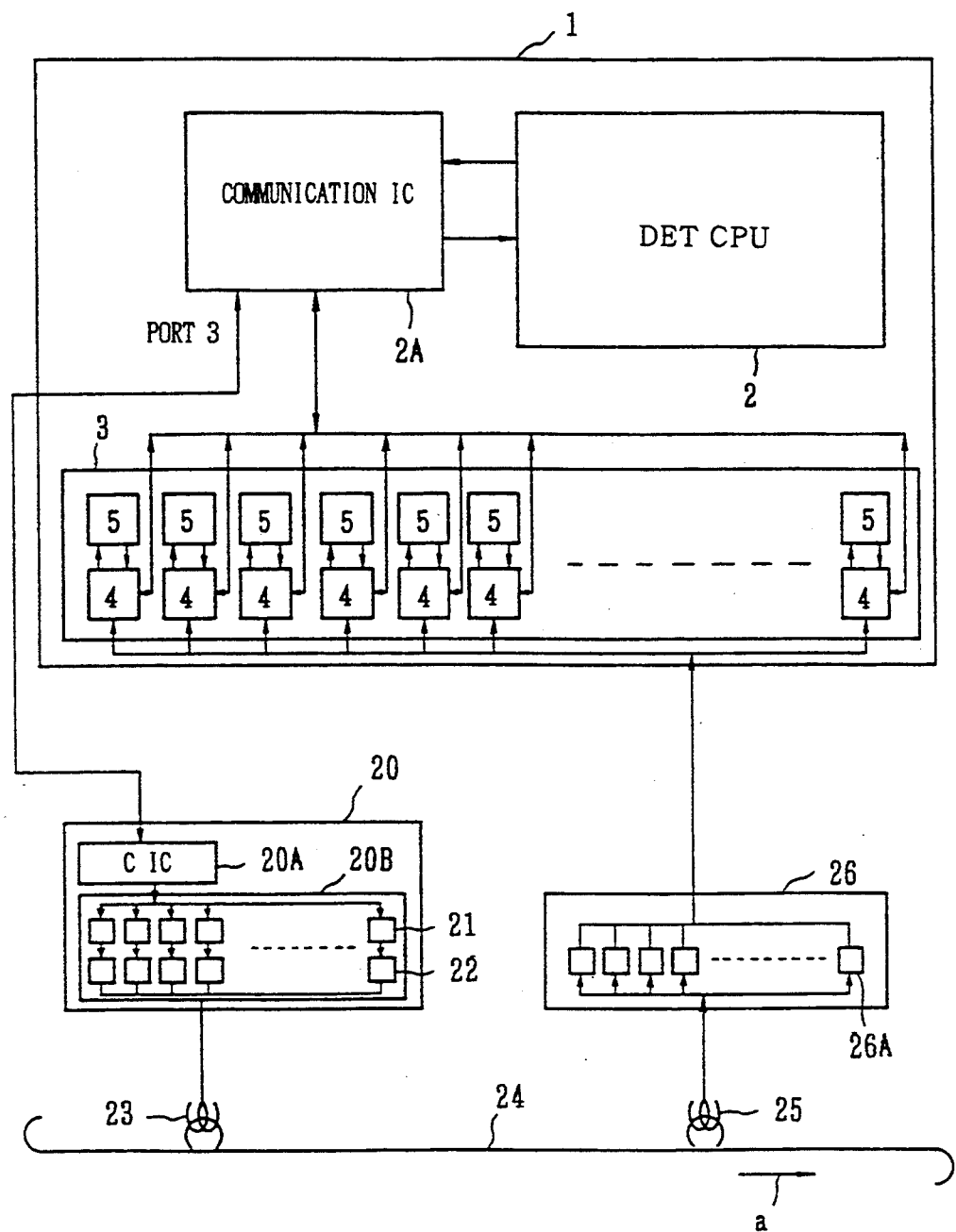
FIG. 14 is a block diagram showing a signal flow when a recording current is automatically adjusted.
Figure 15:
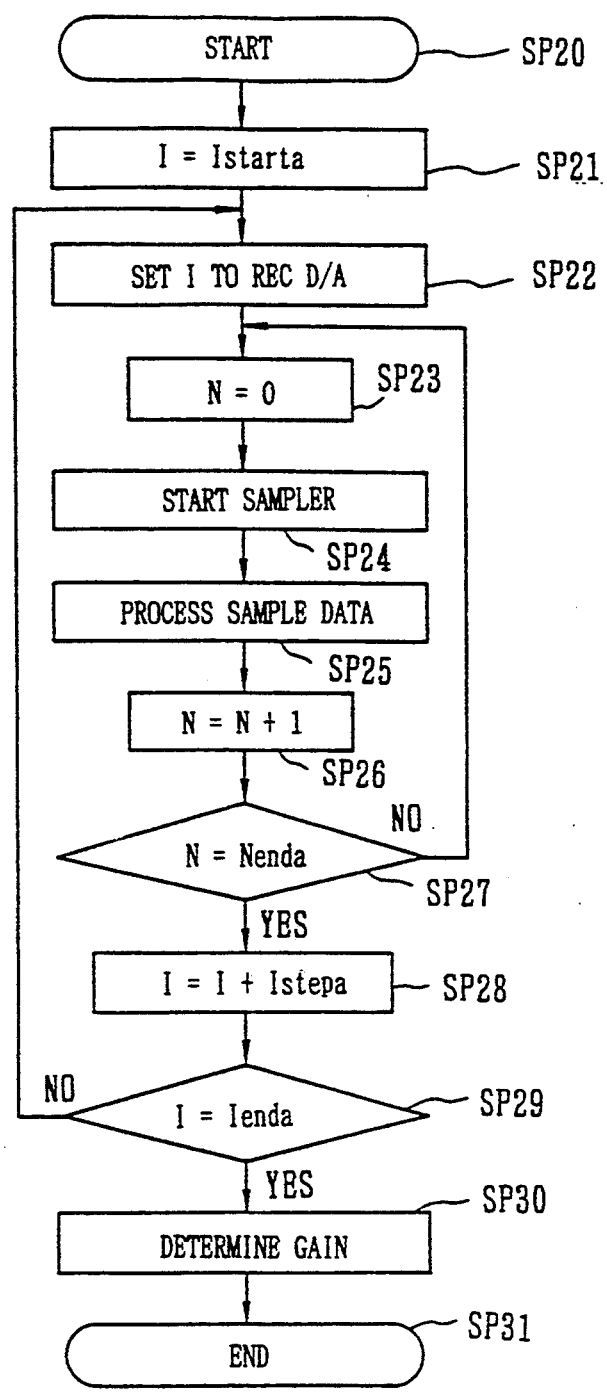
FIG. 15 is a flowchart showing the automatic adjustment processing procedure involving gain control for the recording current.

First, FIG. 14 shows a circuit relating to the automatic adjustment of the recording current, in which the DET CPU 2 sets the recording current value through the port 3 of a serial communication bus. Next, the DET CPU 2 measures a playback signal level by the digital waveform sampler 16 contained in the DET LSI 4 while reproducing the section recorded by the recording current value that had been set. The recording current value can be automatically adjusted by executing the above operation in accordance with the following procedure, in which the DET CPU 2 first executes the recording current automatic adjustment processing procedure (gain control) SP20 shown in FIG. 15, confirms the playback signal levels to the recording currents at several points, and sets an optimum AD GAIN in the DET LSI 4. In the flowchart SP20 reference character I designates a recording current digital data; reference characters Istarta, Ienda designate the initial value and final value of recording current digital data, respectively; and a reference character Istepa designates a variation of the recording current digital data. Further, a reference character N designates the number of times the digital waveform sampler 16 starts, and Nenda-1 designates the number of times the digital waveform sampler 16 starts per piece of the recording current digital data.

Figure 16:
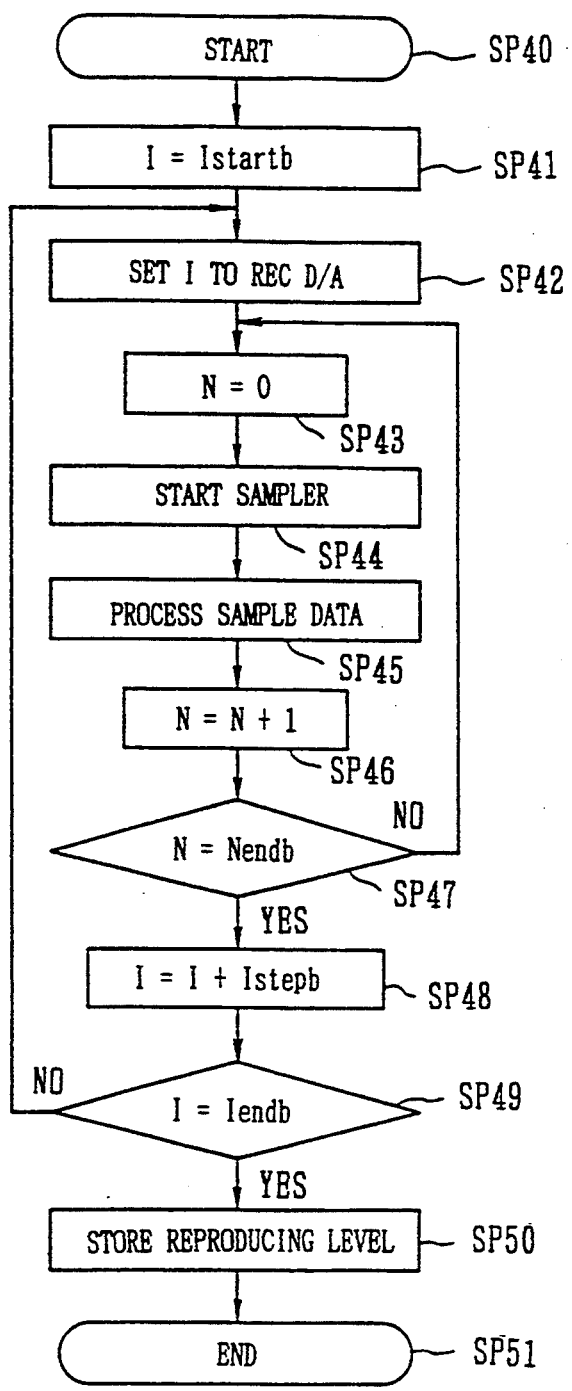
FIG. 16 is a flowchart showing the automatic adjustment processing procedure involving curve trace for the recording current.

Next, the DET CPU 2 executes the recording current automatic adjustment processing procedure (curve trace) SP40 shown in FIG. 16 while maintaining the AD GAIN set by the above recording current automatic adjustment progressing procedure (gain control) SP20 and swings the recording current I and reads a reproducing signal level corresponding thereto. In the flowchart SP40 a reference character I designates recording current digital data; reference characters Istartb, Iendb designate the initial value and final value of the recording current digital data, respectively; and a reference character Istepb designates a variation of the recording current digital data. Further, a reference character N designates the number of starts of the digital waveform sampler 16, and a reference character Nendb-1 designates the number of starts of the digital waveform sampler 16 per a piece of the recording current digital data.

Figure 17:
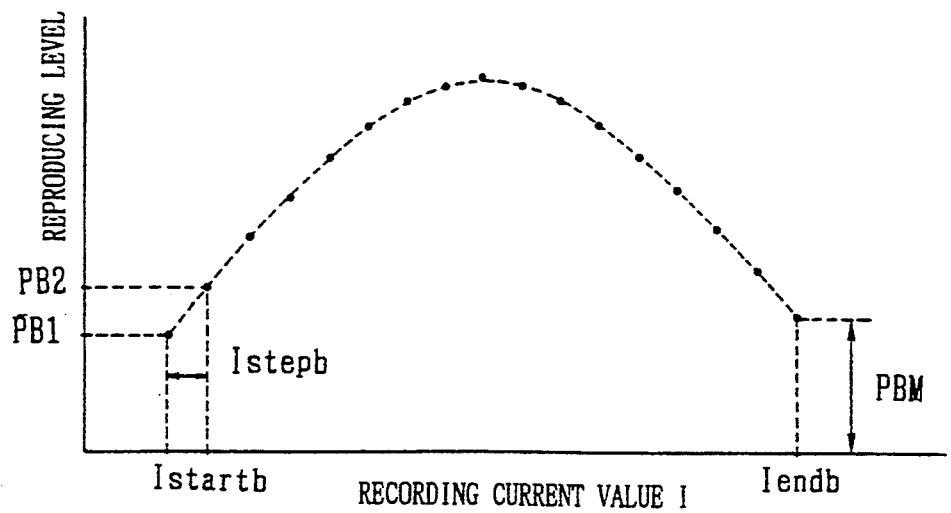
FIG. 17 is a graph showing a characteristic curve explaining a curve trace operation.

As shown in FIG. 17, when the recording current automatic adjustment processing procedure (curve trace) SP40 is executed, curve trace data composed of reproducing signal levels PB1, PB2, ... PBM composed of M pieces of reproducing levels can be obtained by using the recording current values Istartb, Istartb+Istepb ... Iendb as arguments.

Figure 19:
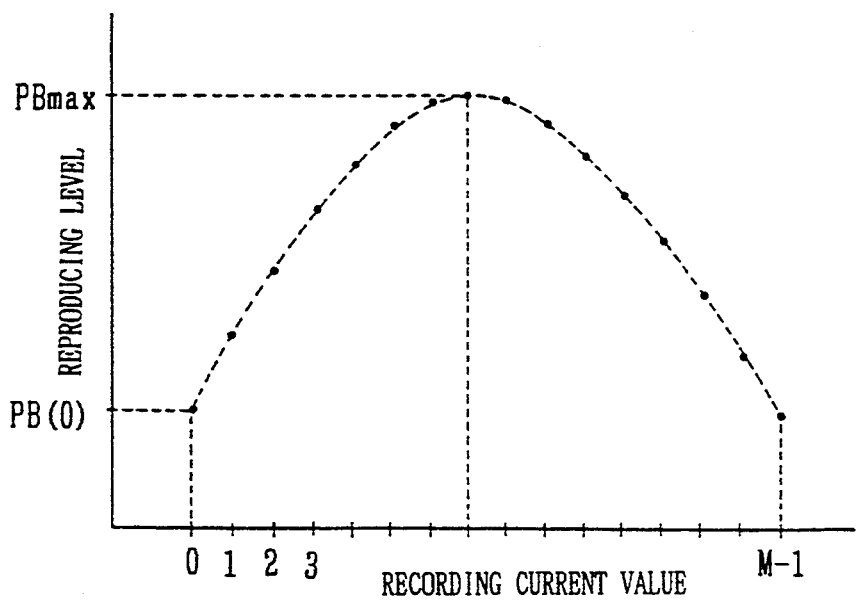
FIG. 19 is a graph showing a characteristic curve explaining a peak search operation.
Figure 18:
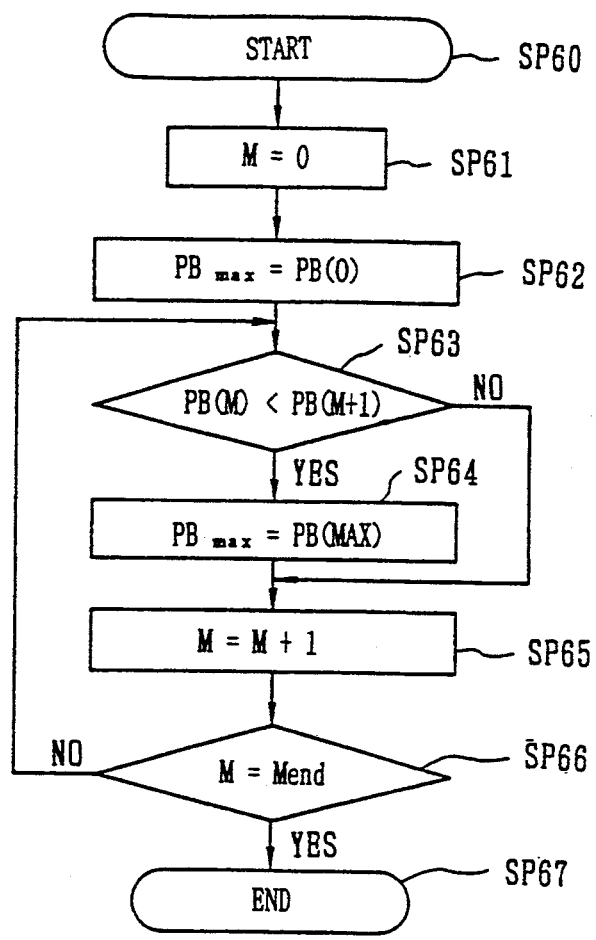
FIG. 18 is a flowchart showing the automatic adjustment processing procedure involving peak search for the recording current.

The DET CPU 2 continuously executes the recording current automatic adjustment processing procedure (peak search) SP60 shown in FIG. 18 with respect to the curve trace data obtained by the above recording current automatic adjustment processing procedure (curve trace) SP40 and determines the peak value of the reproducing signal level. In the flowchart a reference character M designates an argument corresponding to a recording current value; a reference character Mend designates the number of reproducing level samples; and a reference character PBmax designates a buffer for storing the maximum value of the reproducing signal level. As shown in FIG. 19, the maximum value PBmax of the reproducing signal level at the time which the recording current is swung can be obtained by executing the recording current automatic adjustment processing procedure (peak search) SP60.

Figure 20:
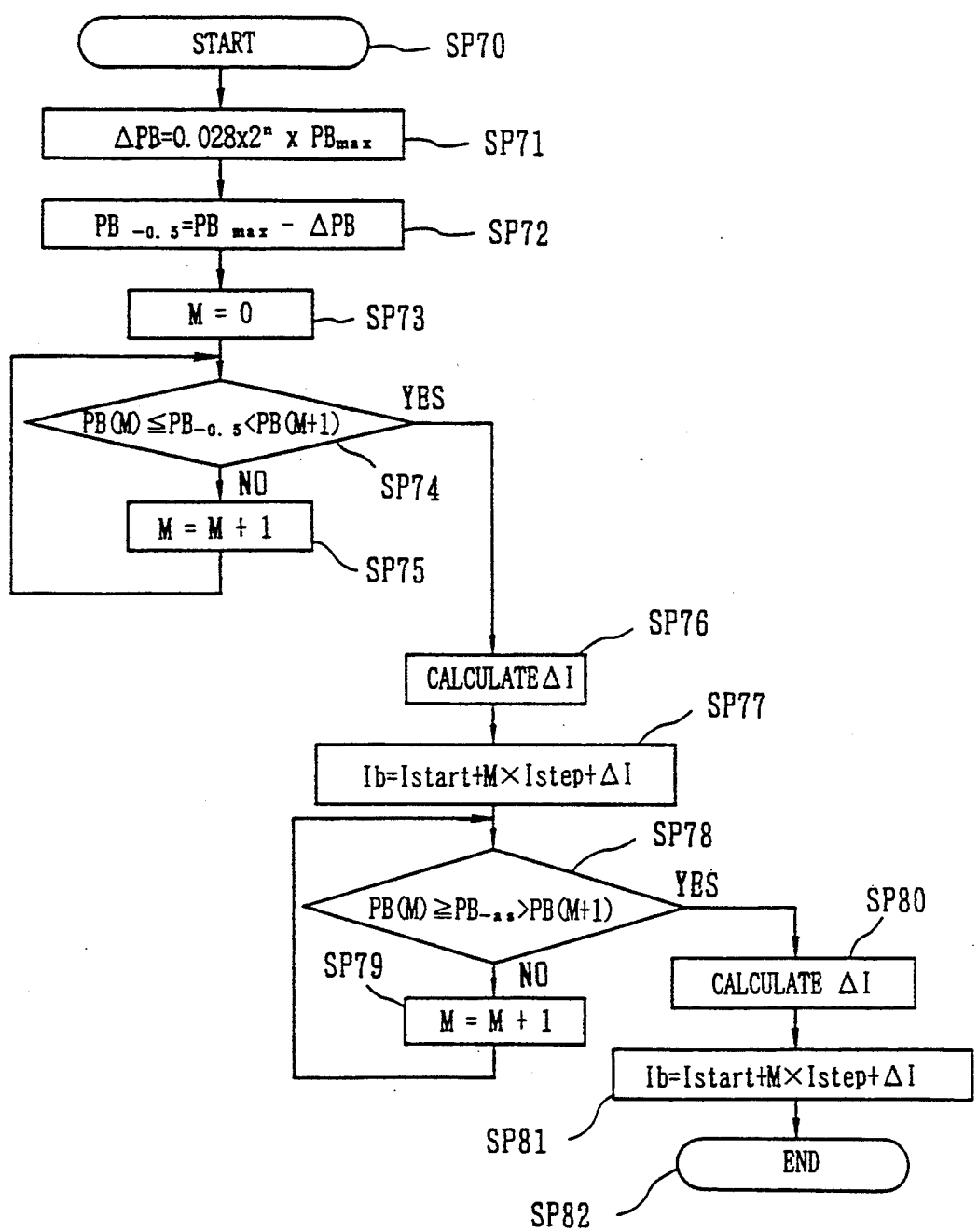
FIG. 20 is a flowchart showing the automatic adjustment processing procedure involving detection of a 0.5 dB drop for the recording current.

The DET CPU 2 continuously executes the recording current automatic adjustment processing procedure, which is the detection of 0.5 dB drop, at SP70 shown in FIG. 20 and determines recording current values Ia and Ib at the point 0.5 dB down from the peak PBmax of the reproducing signal level obtained by the above recording current automatic adjustment processing procedure (peak search) SP60.

In the flowchart, reference character M designates an argument corresponding to a recording current digital data; a reference character PBmax designates a reproducing level peak value; a reference character $PB_{-0.5}$ designates a level down from the reproducing level peak value by 0.5 dB; and a reference character APB designates $PB_{max} - PB_{-0.5}$.

Figure 23:
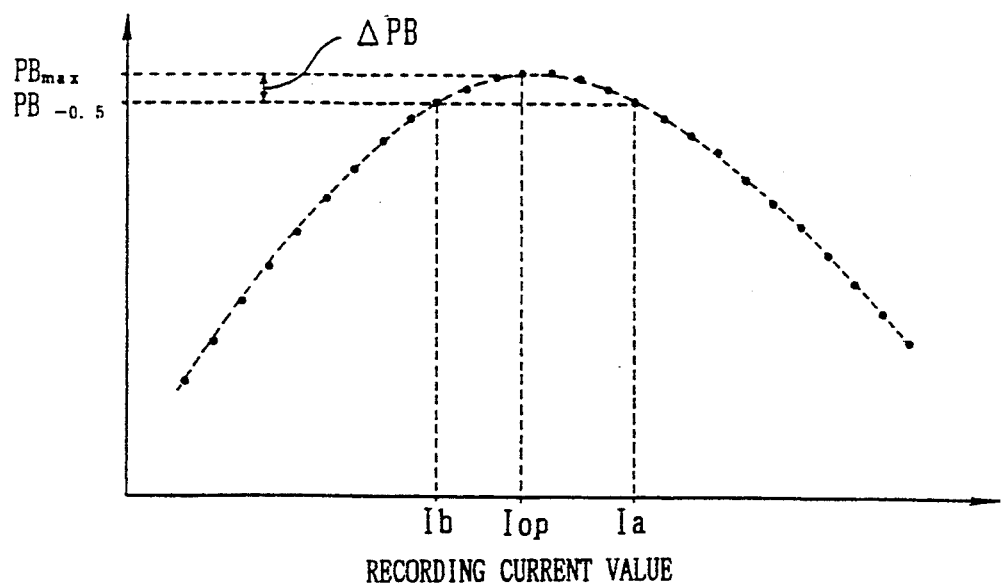
FIG. 23 is a graph showing a characteristic curve explaining the relationship between a recording current value and a reproducing signal level.

Further, a reference character Ia designates an over-current side dropped by 0.5 dB; a reference character Ib designates an under-current side down by 0.5 dB; and a reference character ΔI designates a correction value of recording current digital data. As shown in FIG. 23, recording current values Ia and Ib can be obtained by executing the recording current automatic adjustment processing procedure by detecting a 0.5 dB drop at SP70.

Figure 21:
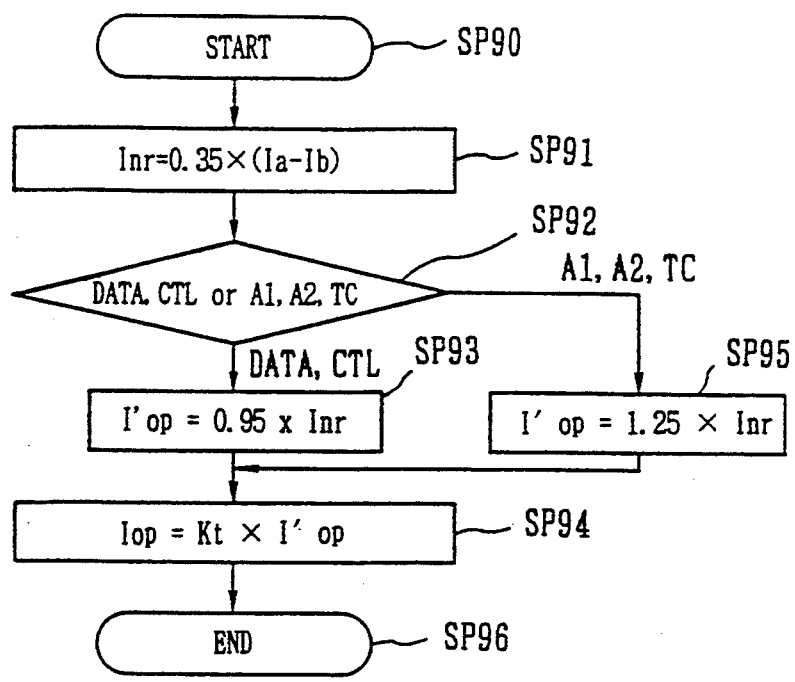
FIG. 21 is a flowchart showing the automatic adjustment processing procedure involving calculation of a current value for the recording current.

The DET CPU 2 continuously executes the recording current automatic adjustment processing procedure, which involves the calculation of a current value SP90 shown in FIG. 21 and determines current values Inr, I'op, Iop from the recording current values Ia and Ib obtained from the above recording current automatic adjustment processing procedure, a detection of a 0.5 dB drop, at step SP70.

The current value Inr is calculated by multiplying the difference between the recording current values Ia and Ib by a coefficient obtained experimentally to obtain the peak of a reproducing level and the current values I'op and Iop are calculated by correcting the current value Inr depending upon the digital track or analog track, respectively.

Figure 22:
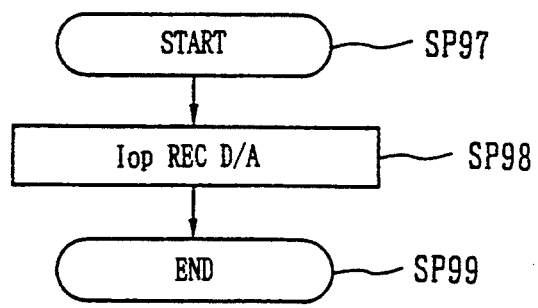
FIG. 22 is a flowchart showing the automatic adjustment processing procedure involving setting of a current value for the recording current.

Finally, the DET CPU 2 executes the recording current automatic adjustment processing procedure SP97 shown in FIG. 22 and sets the current value Iop obtained by the above the recording current automatic adjustment processing procedure SP97 to the recording current control digital to analog conversion circuit 21 on a recording substrate 20 shown in FIG. 14, and thus the recording current can be automatically adjusted as described above.

Figure 24:
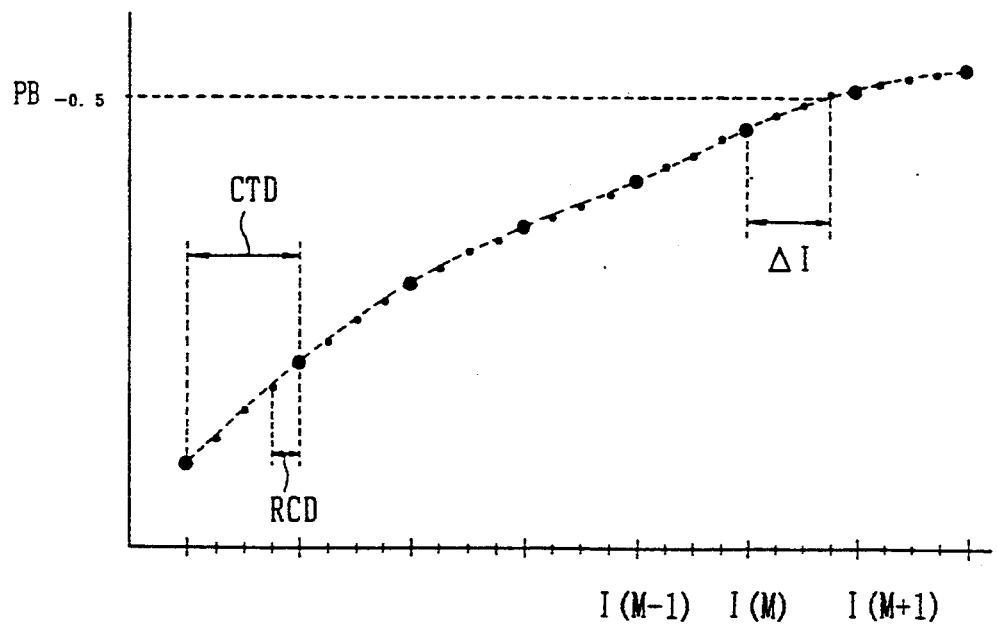
FIG. 24 is a graph showing a characteristic curve explaining a current correction when Istep=4 (LSB)

Note, the data adjusted here is stored in the nonvolatile memory (EEPROM) and loaded to each D/A converter each time power is applied to the unit. This data is used after being corrected or interpolated as shown in FIG. 24. Note, in FIG. 24, in which a reference character CTD designates a curve trace deviation; a reference character RCD designates a deviation of the digital to analog conversion circuit on the recording side; and a reference character ΔI designates a corrected current value, and a current value is corrected in a direction for lowering a reproducing level as described above.

(3-6) The Measurement of Head Azimuth:

The angle of a head azimuth can be adjusted by using the digital waveform sampler 16 contained in the DET LSI 4. When this adjustment is realized, each digital waveform sampler 16 must be started at the same time and the relationship between a recording signal and a sampling frequency must be solved.

Figure 25:
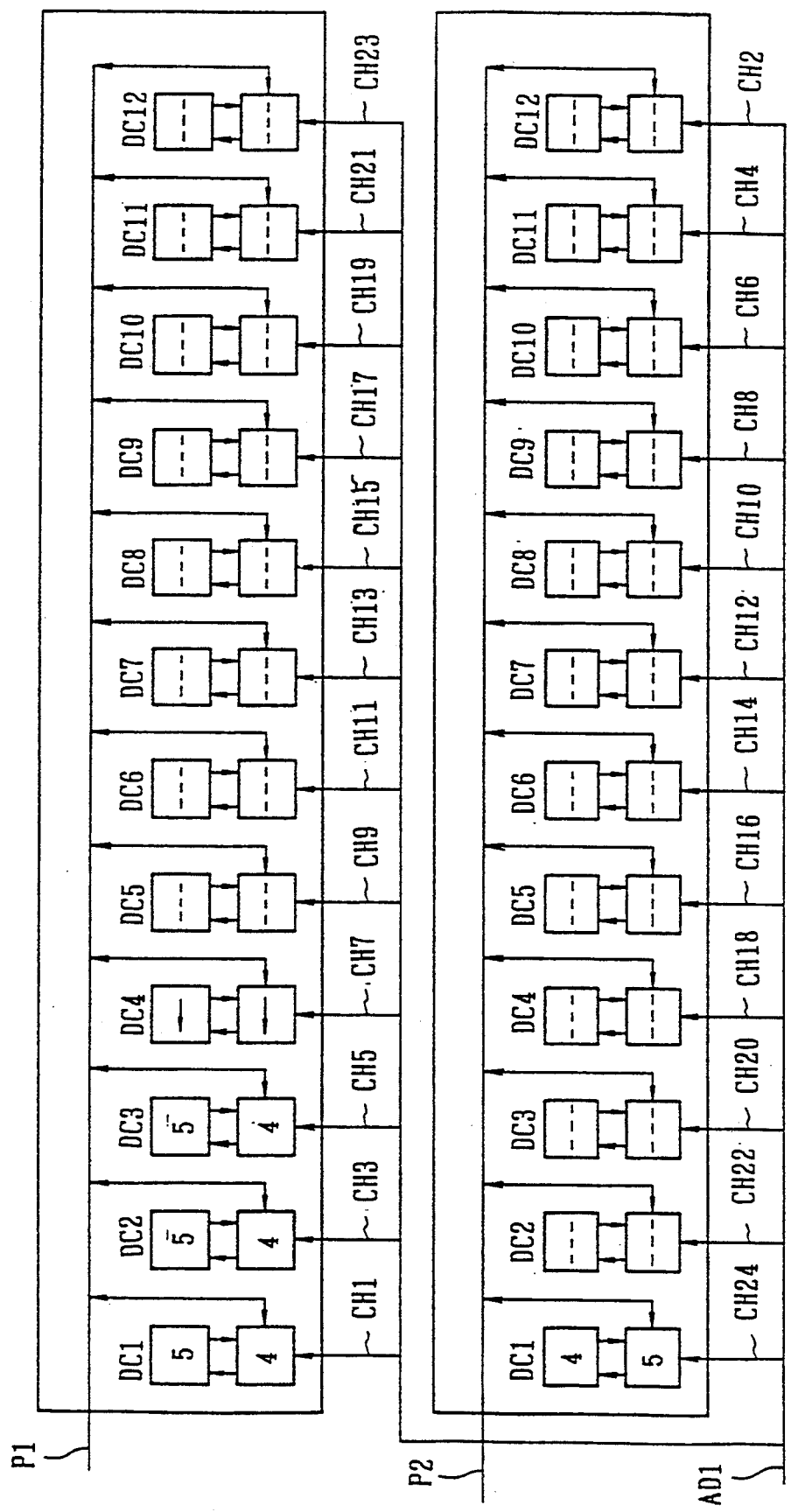
FIG. 25 is a block diagram showing the relationship between a device code and an input channel.

In the digital signal reproducing apparatus 1, digital waveform samplers 16 of two channels are started at the same time to detect the difference of the phases of two waveforms fetched. In a usual method of using the DET LSI 4, the DET CPU 2 can communicate with only a single DET LSI 4 at one time. Thus, the two digital waveform samplers 16 of the two channels can be started at the same time in such a manner that the DET LSIs 4 are divided into two groups and communication buses are independently provided, as shown in FIG. 25.

Further, when the difference of the phases is detected, if the repeated frequency of a recording signal is improper, an adjustment cannot be correctly executed. Although an adjustment accuracy is improved by increasing a recording frequency, the mechanical mounting accuracy is made more stringent. On the other hand, when the recording frequency is lowered, the mechanical mounting accuracy is eased, but the adjustment accuracy is lowered. Thus, the repeated frequency of the recording signal is determined from the mechanical mounting accuracy and further the sampling frequency of the DET LSI 4 is made variable to ensure the adjustment accuracy.

Figure 26:
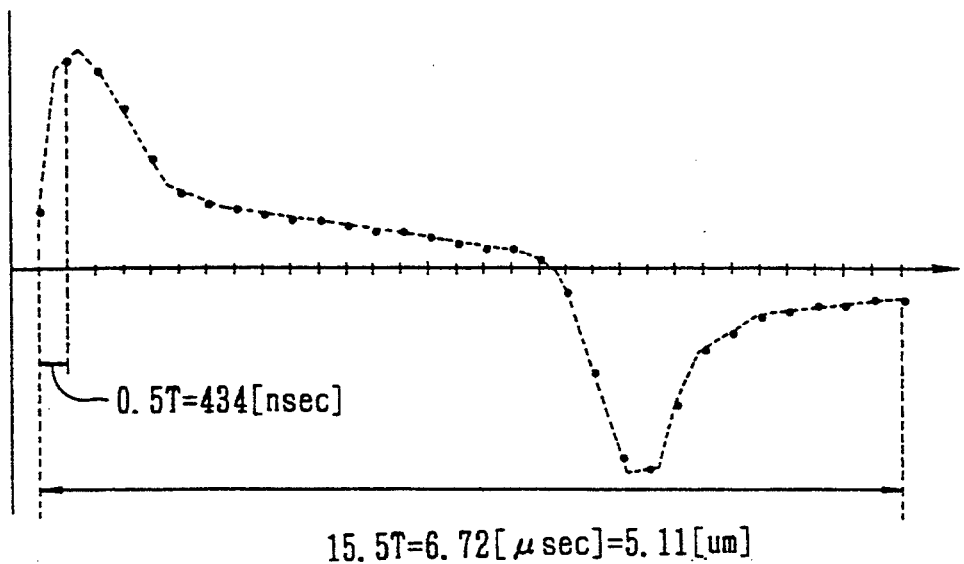
FIG. 26 is a graph of a characteristic curve showing the specification of a waveform sampler.
Figure 27:
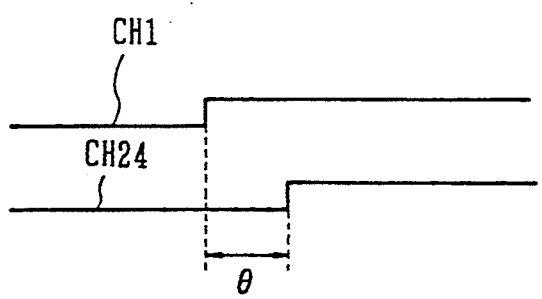
FIG. 27 is a timing chart showing the specification of a head azimuth adjustment.

FIGS. 26 and 27 show the comparison of the digital waveform sampler 16 with the adjustment accuracy of the head azimuth. In FIG. 26, a sampling frequency is 2.304 MHz and a sample is obtained each 0.5 T. In this case, when sampling for 32 bytes is executed, 15.5 T or 6.72 $\mu$sec, 5.11 $\mu$m are required. On the other hand, although the standard of dislocation of a head azimuth is within 5 $\mu$sec=5.76 T, adjustment can be actually executed within 2 $\mu$sec=2.30 T in FIG. 27.

An adjustment method for head azimuth will be described when the respective head azimuths are dislocated as shown in FIG. 28, in which a tape having repeated signals recorded on channels 1CH and 24CH is prepared and the digital waveform samplers 16 of the channels 1CH and 24CH are started at the same time by playing back the tape. The amounts of head-azimuth dislocation are detected from FIGS. 29A and 29B, 29C and 29D, and 29E and 29F showing digitally waveforms of the sampled two channels. Thus, the head azimuths are adjusted by adjusting the head position and looking at the resulting waveforms and repeating as many times as necessary.

Figure 30:
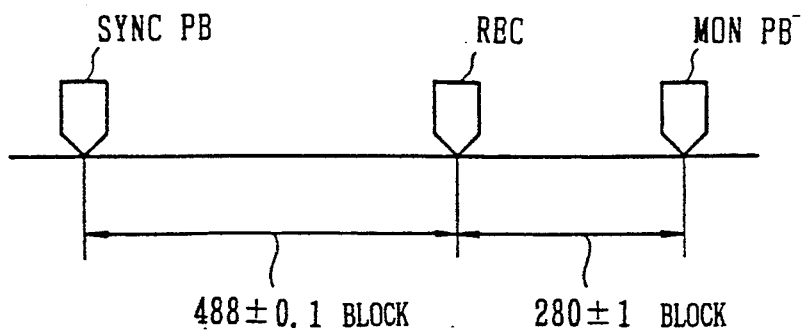
FIG. 30 is a schematic diagram showing the disposition of the magnetic heads.

(3-7) The Measurement of Distance between Heads:

In this digital audio tape recorder, three magnetic heads are disposed as shown in FIG. 30 and the time needed for an edge of a reproduced signal obtained by playing back a magnetic tape to move between two heads is detected to measure the distance between the heads.

Figure 31:
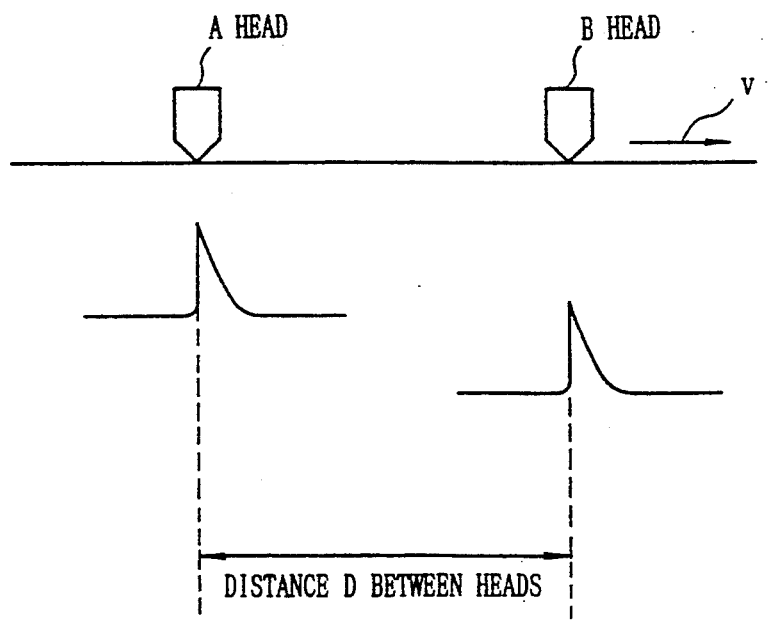
FIG. 31 is a schematic diagram explaining a method of measuring the distance between the heads.

As shown in FIG. 31, an edge passes through the preceding head A and the time the edge passes therethrough is assumed to be tA. Then, the edge moves between the heads at a given tape speed v and reaches the succeeding head B at a time assumed to be tB. When the distance between the head A and the head B is assumed to be D, the distance D between the heads is calculated by the following equation.

$$D = \frac{t_B - t_A}{V} \qquad (8)$$

Figure 32:
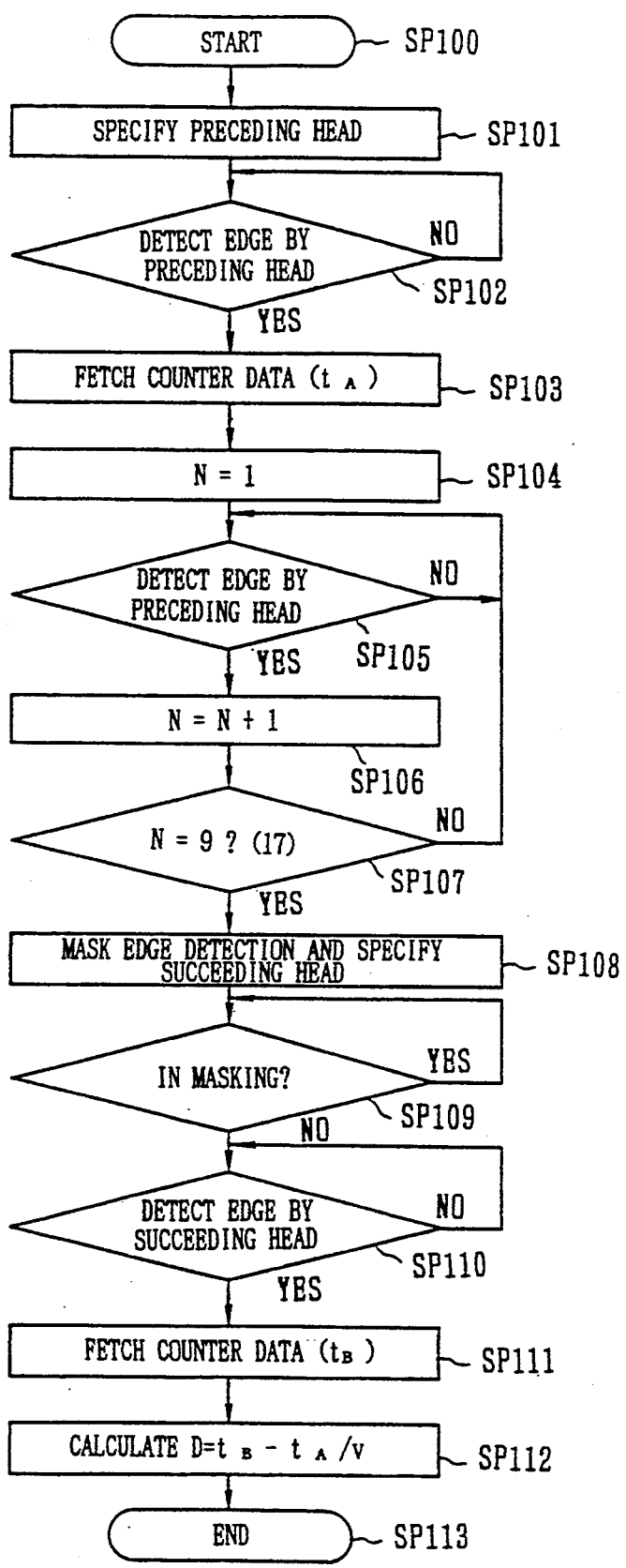
FIG. 32 is a flowchart showing the processing procedure for measuring the distance between the heads.

The DET CPU 2 measures the distance between the heads by the aforesaid method by executing the head distance measurement processing procedure SP100 shown in FIG. 32. More specifically, the DET CPU 2 specifies the preceding head at step SP101 and determines whether or not the edge is detected by the preceding head at next step SP102.

Figure 33:
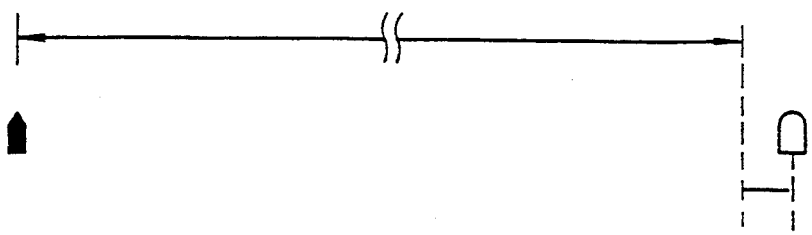
FIGS. 33A to 33F are schematic diagrams explaining the operation for measuring the distance between the heads.
Figure 33:
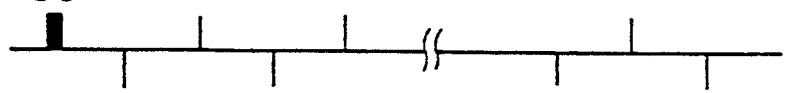
Figure 33:
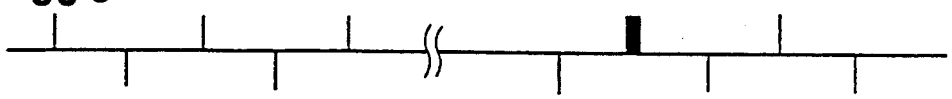
Figure 33:
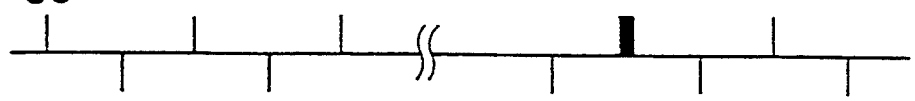
Figure 33:
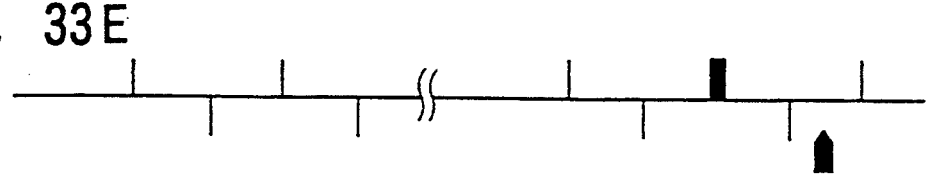
Figure 33:
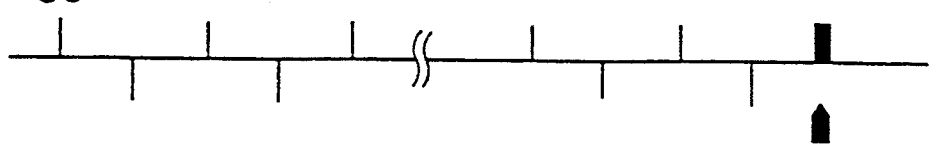

Then, when the edge is detected in this state, as shown in FIGS. 33A and 33B, the DET CPU 2 fetches the value of a free run counter and sets it to $t_A$ at step SP103. The DET CPU 2 continues and sets an edge number counter to 1 at the next step SP104 and further detects whether or not the edge is detected by the preceding head at next step SP105.

Next, when the edge is detected by the preceding head at step SP105, the DET CPU 2 increments the edge number counter N at next step SP106 and determines whether or not the edge number counter N is set to 9 (or 17) at next step SP107. When a negative result is obtained, the process returns to step SP105.

A repeated pattern of 28 blocks is actually recorded on the magnetic tape. As a result, when an edge is detected at intervals of 28 blocks as described with respect to FIG. 30 and an object to be detected is the 280 blocks of a record (REC) head and a monitor (MON) head, it is determined whether or not the edge number counter N is set to 9. When an object to be detected is the 488 blocks of the REC head and a synchronous playback (SYNC PB) head, it is determined whether or not the edge number counter N is set to 17.

Then, when the DET CPU 2 obtains an affirmative result (FIG. 33C) at step SP107, it goes to the next step SP108 and masks edge detection (FIG. 33D) and then specifies a succeeding head. The DET CPU 2 continues to the next step SP109 and determines whether or not it is a mask period MS (FIG. 33E). When the DET CPU 2 obtains a negative result, it goes to step SP110 and determines whether or not the edge is detected by the succeeding head.

When the DET CPU 2 obtains an affirmative result at step SP110, it goes to the next step SP111 and fetches the value of the free run counter and sets it to tB. The DET CPU 2 continues to the next step SP112 and executes the calculation described above with respect to Equation (8) to determine the distance D between the heads and then goes to the next step SP113 to complete the head distance measurement processing procedure. The distance D between the heads can be measured as described above.

(4) The Effects of the Above-Described Embodiment:

According to this embodiment, since the digital signal reproducing apparatus 1 is composed of the digital waveform equalizing LSIs each added with the sampling clock generator complying with multi-Fs, EX-DET, EX-SEP, the edge detection circuit, and the DC following circuit, a digital signal reproducing apparatus 1 can be realized which can easily execute the automatic adjustment of a reproducing level and waveform equalizing equalizer coefficients, automatic measurement of an error rate, automatic determination of PWM recording/bias recording, automatic adjustment of a recording current, measurement of a head height, alignment of head azimuth, and measurement of the distance between the heads.

While the above has been presented in connection with the preferred embodiments of the invention, it will be apparent to those skilled in the art that various changes and modifications may be made without departing form the spirit and scope of the invention, which is to be determined solely from the appended claims.

What is claimed is:

1. A digital signal reproducing apparatus for obtaining a reproducing signal from a reproduced analog signal waveform obtained by reproducing a digital signal recorded on a magnetic tape, comprising:

waveform equalization means for processing said reproduced analog signal according to a predetermined analog signal processing and for converting a processed signal to a digital signal and for equalizing the waveform of said digital signal by a digital filter and for sampling the waveform of said digital signal, whereby said digital signal and extracted clocks are supplied as outputs of said waveform equalization means;

a clock generation means for generating an operation clock signal of said waveform equalization means;

an error detection means for executing digital error detection processing on said digital signal obtained from said waveform equalization means; and an edge detection means for detecting the edge of said digital signal by using a result of the waveform sampling executed by said waveform equalization means, wherein said waveform equalization means includes an analog signal processing circuit and a digital waveform sampler for sampling the waveform of said digital signal, so that a reproduction level is automatically adjusted in said analog signal processing circuit based on the result of the waveform sampling executed by said digital waveform sampler of said waveform equalization means and a gain of said analog signal processing executed by said waveform equalization means is controlled.

2. The digital signal reproducing apparatus of claim 1, further comprising a slave central processing unit for obtaining a first ratio of the number of data exceeding a predetermined threshold value THL and the number of data bytes in the sample and a second ratio of the number of full swing data and the number of bytes in the sample and for changing said gain in response to values of said first ratio and said second ratio having a predetermined condition.

3. The digital signal reproducing apparatus of claim 2, wherein said first ratio represents a reference level probability (DO) and said second ratio represents a full swing probability (DF) and said predetermined condition is satisfied by the following equation D0>D0min and Df<Dfmax.

4. The digital signal reproducing apparatus of claim 1, further comprising a slave central processing unit and wherein said waveform equalization means includes a digital waveform sampler for sampling the waveform of said digital signal, whereby equalizer coefficients are automatically adjusted so that predetermined equalizer coefficients are set to the digital filter of said waveform equalization means based on the result of the waveform sampling executed by said digital waveform sampler, the result of error detection processing obtained from said error detection means is fed to said slave central processing unit and the number of errors is minimized thereby.

5. The digital signal reproducing apparatus of claim 1, wherein an error rate is automatically measured based on the result of an error detected from the digital signal of said waveform equalization means by a block counter and an error rate counter included in said error detection means.

6. The digital signal reproducing apparatus of claim 1, wherein whether the signal recorded on said magnetic tape is based on a pulse width modulation recording system or a bias recording system is automatically determined by an external adjustment waveform equalization means receiving the signal reproduced from the magnetic tape for detecting whether the zero-cross point is more than a predetermined value or not from the result of the waveform sampling executed by the waveform equalization means.

7. The digital signal reproducing apparatus of claim 1, further comprising a slave central processing circuit and wherein said waveform equalization means includes a digital waveform sampling circuit for sampling the waveform of said digital signal, so that when each signal on magnetic tape recorded by all kinds of recording currents is reproduced, the reproducing signal level is measured by said slave central processing unit based on the result of said waveform sampling by said waveform sampling circuit, and an optimum current value of the recording current is set by said slave central processing unit.

8. The digital signal reproducing apparatus of claim 1, further comprising a slave central processing unit and wherein the distance between a preceding head and a succeeding head is measured by said slave central processing unit based on the result of the edge detection of said digital signal by said edge detection means, the result being obtained by recording predetermined repeating signals on a magnetic tape and sequentially playing back said magnetic tape by changing back and forth said preceding head and said succeeding head.

9. The digital signal reproducing apparatus of claim 1, wherein said magnetic tape has recorded thereon a plurality of channels of digital signals and said waveform equalization means comprises a respective plurality of channel waveform equalization means and an external adjustment waveform equalization means, and when adjustment is executed in reproducing the signal on the magnetic tape, said external adjustment waveform equalization means is used.

10. The digital signal reproducing apparatus of claim 1, wherein said clock generation means generates a plurality of sampling clocks having respective different frequencies.

* * * * *